(12) United States Patent
Furukawa

(10) Patent No.: US 10,165,633 B2
(45) Date of Patent: Dec. 25, 2018

(54) LIGHT EMITTING ELEMENT DRIVING CIRCUIT, LIGHT EMITTING DEVICE, DISPLAY DEVICE, AND LIGHT EMISSION CONTROLLING METHOD

(71) Applicant: Sony Corporation, Tokyo (JP)

(72) Inventor: Norimasa Furukawa, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/717,430

(22) Filed: May 20, 2015

(65) Prior Publication Data

US 2015/0257220 A1 Sep. 10, 2015

Related U.S. Application Data

(62) Division of application No. 13/348,823, filed on Jan. 12, 2012.

(30) Foreign Application Priority Data

Jan. 21, 2011 (JP) .................. 2011-010449

(51) Int. Cl.
*G09G 3/22* (2006.01)
*H05B 33/08* (2006.01)
*G09G 3/34* (2006.01)

(52) U.S. Cl.
CPC ......... *H05B 33/0815* (2013.01); *G09G 3/342* (2013.01); *H05B 33/0896* (2013.01); *G09G 2310/024* (2013.01); *G09G 2330/025* (2013.01)

(58) Field of Classification Search
CPC .................................................. G09G 3/342
See application file for complete search history.

(56) References Cited

U.S. PATENT DOCUMENTS 4,190,836 A 2/1980 Kimura et al.
4,580,293 A * 4/1986 Reichle .................. H01S 5/042
327/109

(Continued)

FOREIGN PATENT DOCUMENTS

CN 1721943 A 1/2006
JP 2002208495 A 7/2002

(Continued)

OTHER PUBLICATIONS

Rectification and Filtering—Basic Car Audio Electronics, downloaded from http://www.bcae1.com/tranfilt.htm on Oct. 27, 2017, initial publish date Feb. 1, 2002, pp. 1-7.*

(Continued)

*Primary Examiner* — Dorothy Harris
(74) *Attorney, Agent, or Firm* — Lerner, David, Littenberg, Krumholz & Mentlik, LLP

(57) ABSTRACT

Disclosed herein is a light emitting element driving circuit including: a capacitive element; a current limiting section limiting a charging current for the capacitive element; a first constant current source stabilizing a discharging current supplied from the capacitive element to a light emitting element; and a switch controlling ON and OFF in supplying the discharging current to the light emitting element. The capacitive element is charged with electricity from the power source circuit in the preceding stage through the current limiting section. Also, the electric charges in the capacitive element are discharged in the form of a given discharging current for the discharging time period, and the light emitting element emits light in accordance with the given discharging current. In this case, the charging current for the capacitive element is limited by the current limiting section in such a way that the current value thereof becomes small.

6 Claims, 16 Drawing Sheets

(56) References Cited

U.S. PATENT DOCUMENTS

| | | | | |
|---|---|---|---|---|
| 6,469,455 | B1* | 10/2002 | Inoue | H05B 33/0803 315/169.3 |
| 6,985,124 | B1* | 1/2006 | Nogawa | G09G 3/32 345/55 |
| 7,400,310 | B2* | 7/2008 | LeMay | H05B 33/0818 315/149 |
| 2003/0016205 | A1 | 1/2003 | Kawabata et al. | |
| 2006/0022607 | A1* | 2/2006 | Hsu | G09G 3/3406 315/209 R |
| 2007/0091030 | A1* | 4/2007 | Drevillon | G09G 3/3233 345/76 |
| 2008/0048567 | A1 | 2/2008 | Steele et al. | |
| 2008/0297058 | A1* | 12/2008 | Soos | H05B 33/0803 315/185 R |
| 2009/0315471 | A1 | 12/2009 | Rowland | |
| 2010/0110059 | A1 | 5/2010 | Kang et al. | |
| 2011/0002069 | A1* | 1/2011 | Yamano | H05B 33/0812 361/18 |
| 2011/0068700 | A1* | 3/2011 | Fan | H05B 33/0818 315/185 R |
| 2011/0285300 | A1* | 11/2011 | Yang | H05B 33/0818 315/193 |
| 2011/0316449 | A1* | 12/2011 | Imanaka | H05B 33/0815 315/307 |
| 2012/0056551 | A1* | 3/2012 | Zhu | H02M 1/4258 315/232 |

FOREIGN PATENT DOCUMENTS

| | | |
|---|---|---|
| JP | 2010-004692 A | 1/2010 |
| KR | 20030009190 A | 1/2003 |
| KR | 20100050908 A | 5/2010 |

OTHER PUBLICATIONS

Dunford, Calculating the Time Constant of an RC Circuit, Undergraduate Journal of Mathematical Modeling: One + Two, vol. 2, Issue 2, Article 3, Spring 2010, pp. 1-11.*

Current and resistance, downloaded from http://physics.bu.edu/~duffy/PY106/Resistance.html on Oct. 27, 2017, initial publish date Jul. 12, 1999, pp. 1-6.*

Charging and Discharging a capacitor downloaded from http://macao.communications.museum/eng/exhibition/secondfloor/MoreInfo/2_3_5_ChargingCapacitor.html on Apr. 18, 2018, 2 pages.*

Hughes, Lecture 9: Variable currents; Thevenin Equivalence, Mar. 8, 2005, pp. 80-88.*

Chinese Office Action for CN Application No. 201210018833.1, dated Dec. 24, 2014.

Korean Office Action for KR Application No. 10-2011-0139012, dated Jan. 7, 2018.

Korean Office Action for KR Application No. 1020110139012, dated Jun. 27, 2018.

* cited by examiner

F I G . 5
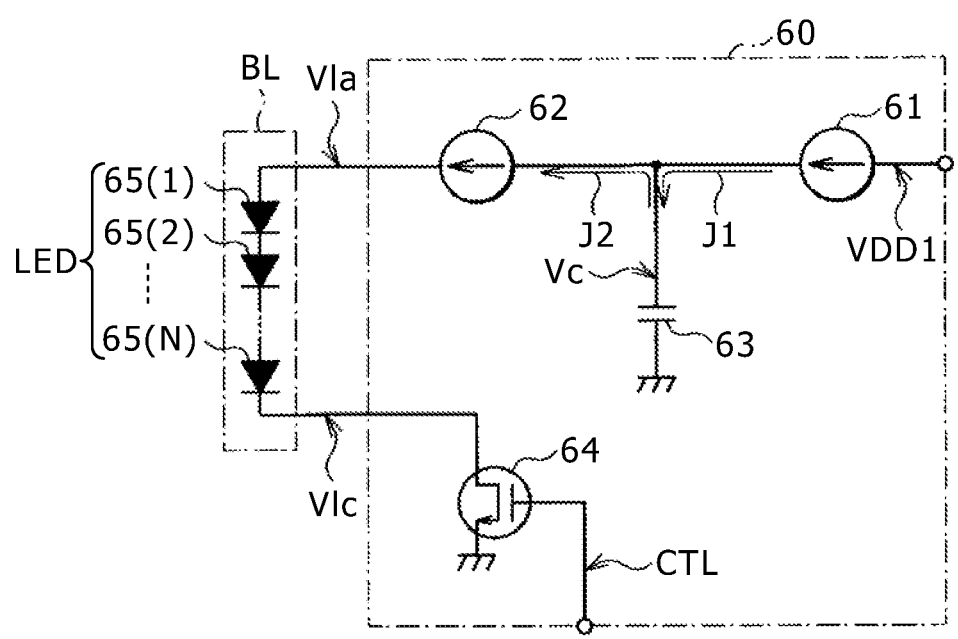

LIGHT EMITTING ELEMENT DRIVING CIRCUIT, LIGHT EMITTING DEVICE, DISPLAY DEVICE, AND LIGHT EMISSION CONTROLLING METHOD

CROSS-REFERENCE TO RELATED APPLICATION

The present application is a divisional of U.S. application Ser. No. 13/348,823, filed Jan. 12, 2012, which claims priority from Japanese Patent Application No. JP 2011-010449 filed in the Japanese Patent Office on Jan. 21, 2011, the entire content of which is incorporated herein by reference.

BACKGROUND

The present disclosure relates to a light emitting element driving circuit for driving a light emitting element, a light emitting device and a display device each of which includes such a light emitting element driving circuit, and a light emission controlling method used in the light emitting element driving circuit, the light emitting device, and the display device.

A light emitting element is often used in an electronic apparatus. For example, in a liquid crystal display device, a backlight is used in a transmission type liquid crystal device, and a front light is used in a reflection type liquid crystal display device. In such a liquid crystal display device, an image displayed on a liquid crystal display portion is observed by using lights emitted from the respective light emitting elements. In addition, in a camera, a flash lamp is frequently used for photographing in a dark place.

Such a light emitting element generally requires a relatively large current for light emission. Some proposals have been made as a driving circuit for driving the light emitting element requiring such a large current. For example, Japanese Patent Laid-Open No. 2010-4692, referred to as Patent Document 1 hereinafter, discloses a power source unit for flash in which a Light Emitting Diode (LED) is used as a light emitting element, a capacitor is charged with electricity by using a boosting circuit (power source circuit), and the electric charges accumulated in the capacitor are discharged at a predetermined current value, thereby flash-lighting the light emitting element.

SUMMARY

A load current becomes large in the power source circuit for supplying current to the light emitting element requiring such a large current. In other words, such a power source circuit needs to have a high ability for supplying current.

Now, in recent electronic apparatuses, a design is an important element. Thus, it is desired to compactly construct the electronic apparatus. Therefore, it is desired that a light emitting device used in such an electronic apparatus is also compact.

In general, however, the size of a power source circuit having the high ability for supplying current becomes large in many cases. In such cases, since the light emitting device grows in size, the electronic apparatus grows in size or the latitude of the design is reduced.

The present disclosure has been made in consideration of the problems described above, and it is therefore desirable to provide a light emitting element driving circuit, a light emitting device, a display device, and a light emission controlling method which can miniaturize a device.

According to an embodiment of the present disclosure, there is provided a light emitting element driving circuit including: a capacitive element; a current limiting section limiting a charging current for the capacitive element; a first constant current source stabilizing a discharging current supplied from the capacitive element to a light emitting element; and a switch controlling ON and OFF in supplying the discharging current to the light emitting element.

According to another embodiment of the present disclosure, there is provided a light emitting device including: a light emitting portion including one or plural light emitting elements; and a light emission driving circuit driving the light emitting portion. The light emission driving circuit includes: a capacitive element; a current limiting section limiting a charging current for the capacitive element; a first constant current source stabilizing a discharging current supplied from the capacitive element to a light emitting element; and a switch controlling ON and OFF in supplying the discharging current to the light emitting element.

According to further embodiment of the present disclosure, there is provided a display device including: a display portion; a light emitting portion including one or plural light emitting elements and supplying light to the display portion; and a light emission driving circuit driving the light emitting portion. The light emission driving circuit includes: a capacitive element; a current limiting section limiting a charging current for the capacitive element; a first constant current source stabilizing a discharging current supplied from the capacitive element to each of the light emitting elements; and a switch controlling ON and OFF in supplying the discharging current to each of the light emitting element.

According to still further embodiment of the present disclosure, there is provided a light emission controlling method including: limiting and charging a charging current for a capacitive element; and discharging electric charges accumulated in the capacitive element in a form of a given discharging current for a discharging time period, and causing a light emitting element to emit light in accordance with the discharging current.

In the light emitting element driving circuit, the light emitting device, the display device, and the light emission controlling method according to the embodiments of the present disclosure, the capacitive element is charged with electricity from the power source circuit in the preceding stage of the capacitive element through the current limiting section. Also, the electric charges accumulated in the capacitive element are discharged in the form of a given discharging current for the discharging time period, and the light emitting element is caused to emit light in accordance with the given discharging current. In this case, the charging current for the capacitive element is limited by the current limiting section in such a way that the current value thereof becomes small.

In the light emitting element driving circuit, for example, the current limiting section can use a second constant current source for steadily supplying a constant charging current to the capacitive element. As a result, since the charging current for the capacitive element becomes direct-current electricity, the current value thereof can be reduced.

By adopting the light emitting element driving circuit, the light emitting device, the display device, and the light emission controlling method according to the embodiments of the present disclosure, since the charging current is limited by the current limiting section so as to be reduced, it is possible to miniaturize the device.

BRIEF DESCRIPTION OF THE DRAWINGS

FIG. 5 is a circuit diagram showing a configuration of a light emission driving block and a light emitting portion shown in FIG. 1;

DETAILED DESCRIPTION OF THE PREFERRED EMBODIMENTS

Embodiments of the present disclosure will be described in detail hereinafter with reference to the accompanying drawings. It is noted that the description will be given below in accordance with the following order:

1. First Embodiment;
2. Second Embodiment; and
3. Third Embodiment.

1. First Embodiment

[Configuration]

(Entire Configuration)

Figure 1:
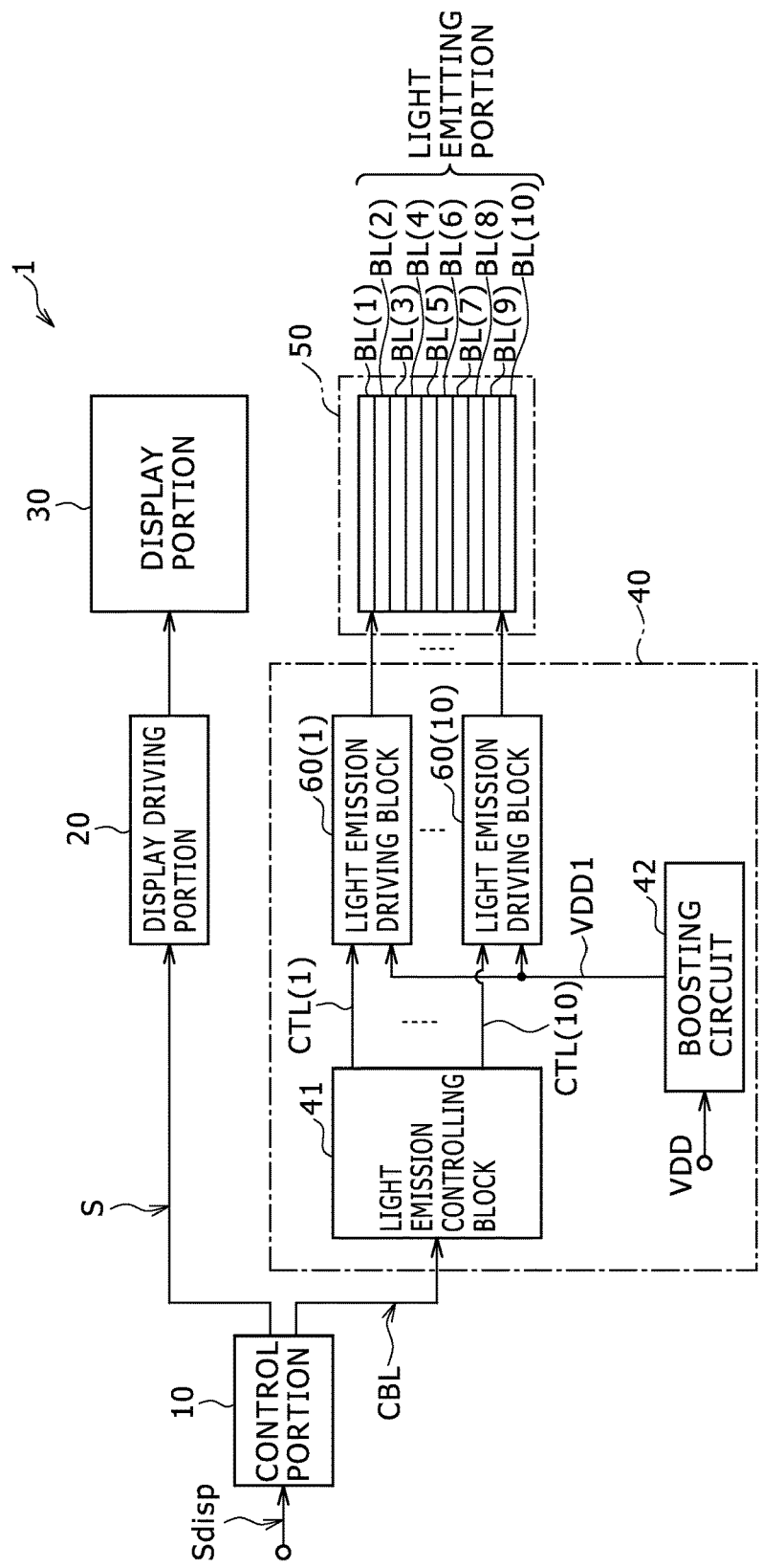
FIG. 1 is a block diagram showing a configuration of a display device according to a first embodiment of the present disclosure.

FIG. 1 is a block diagram showing a configuration of a display device according to a first embodiment of the present disclosure. The display device is a transmission type liquid crystal display device having a backlight. It is noted that since a light emitting element driving circuit, a light emitting device, and a light emission controlling method according to the first embodiment of the present disclosure are embodied in the first embodiment, they will be described below in conjunction with the display device. The display device 1 includes a control portion 10, a display driving portion 20, a display portion 30, a backlight driving portion 40, and the backlight 50.

The control portion 10 is a circuit for supplying control signals to the display driving portion 20 and the backlight driving portion 40, respectively, in accordance with a video signal Sdisp supplied thereto from the outside, and controlling in such a way that the display driving portion 20 and the backlight driving portion 40 are operated synchronously with each other. Specifically, the control portion 10 supplies a video signal S based on the video signal Sdisp to the display driving portion 20, and supplies a backlight control signal CBL to the backlight driving portion 40.

The display driving portion 20 drives the display portion 30 in accordance with the video signal S supplied thereto from the control portion 10. The display portion 30 is a liquid crystal display portion in this case, and modulates a light emitted from the backlight 50 by driving the liquid crystal display elements, thereby carrying out the display.

Figure 2:
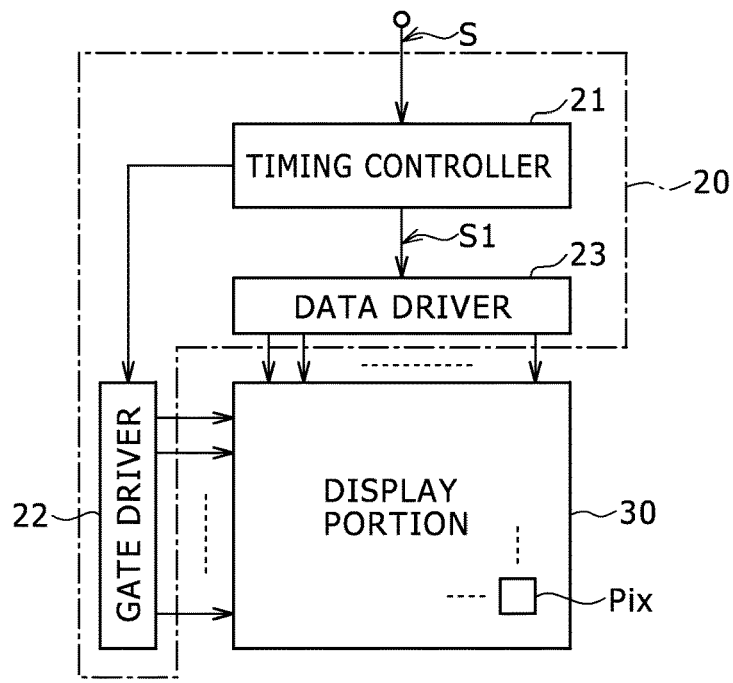
FIG. 2 is a block diagram showing a configuration of a display driving portion and a display portion shown in FIG. 1.

FIG. 2 is a block diagram showing a configuration of the display driving portion 20 and the display portion 30. The display driving portion 20 includes a timing controller 21, a gate driver 22, and a data driver 23. The timing controller 21 controls drive timings for the gate driver 22 and the data driver 23, and supplies the video signal S supplied thereto from the control portion 10 as a video signal S1 to the data driver 23. The gate driver 22 successively selects pixels Pix disposed within the display portion 30 with respect to each row in accordance with the timing control made by the timing controller 21, thereby carrying out line-sequential scanning. The data driver 23 supplies a pixel signal based on the video signal S1 to the pixels Pix in the display portion 30.

Figure 3:
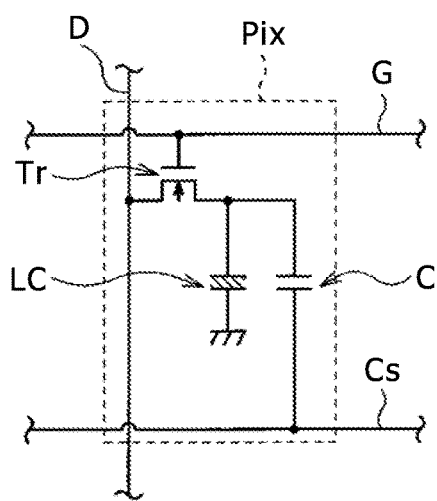
FIG. 3 is an explanatory diagram showing a configuration of the display portion shown in FIG. 1.

FIG. 3 is a circuit diagram showing a configuration of the pixel Pix. The pixel Pix includes a Thin Film Transistor (TFT) element Tr, a liquid crystal element LC, and a hold capacitive element C. The TFT element Tr, for example, is composed of a Metal Oxide Semiconductor-Field Effect Transistor (MOS-FET). A gate terminal of the TFT element Tr is connected to a gate line G, a source terminal thereof is connected to a data line D, and a drain terminal thereof is connected to each of one end of the liquid crystal element LC and one end of the hold capacitive element C. One end of the liquid crystal element LC is connected to the drain terminal of the TFT element Tr, and the other end thereof is grounded. One end of the hold capacitive element C is connected to the drain terminal of the TFT element Tr, and the other end thereof is connected to a hold capacitive line Cs. Also, the gate line G is connected to the gate driver 22, and the data line D is connected to the data driver 23.

With this configuration, the light emitted from the backlight 50 is modulated in intensity thereof in each of the pixels Pix in accordance with the pixel signal supplied through the data line D. Also, the intensity modulation is carried out over a display surface of the display portion 30, thereby displaying an image on the display portion 30.

The backlight driving portion 40 drives the backlight 50 in accordance with the backlight control signal CBL supplied thereto from the control portion 10. The backlight 50 has a function of emitting light to the display portion 30. The backlight 50 has a function of emitting a surface-emitted light to the display portion 30, and is composed of plural light emitting portions BL (10 light emitting portions BL(1) to BL(10) in this case) which can emit lights, respectively, independently of one another. The backlight driving portion 40, as will be described later, scans and drives the light emitting portions BL in such a way that the light emitting portions BL of the backlight 50 successively emit light, respectively, synchronously with the display scanning in the display portion 30. As a result, the display device 1 can reduce so-called moving image blurring and thus can enhance the image quality.

The backlight driving portion 40, as shown in FIG. 1, includes a light emission controlling block 41, a boosting circuit 42, and plural light emission driving blocks 60 (light emission driving blocks 60(1) to 60(10)) corresponding to the light emitting portions BL, respectively.

The light emission controlling block 41 generates discharge control signals CTL (discharge control signals CTL(1) to CTL(10)) used to control each of the light emission driving blocks 60, in accordance with the backlight control signal CBL.

Figure 4:
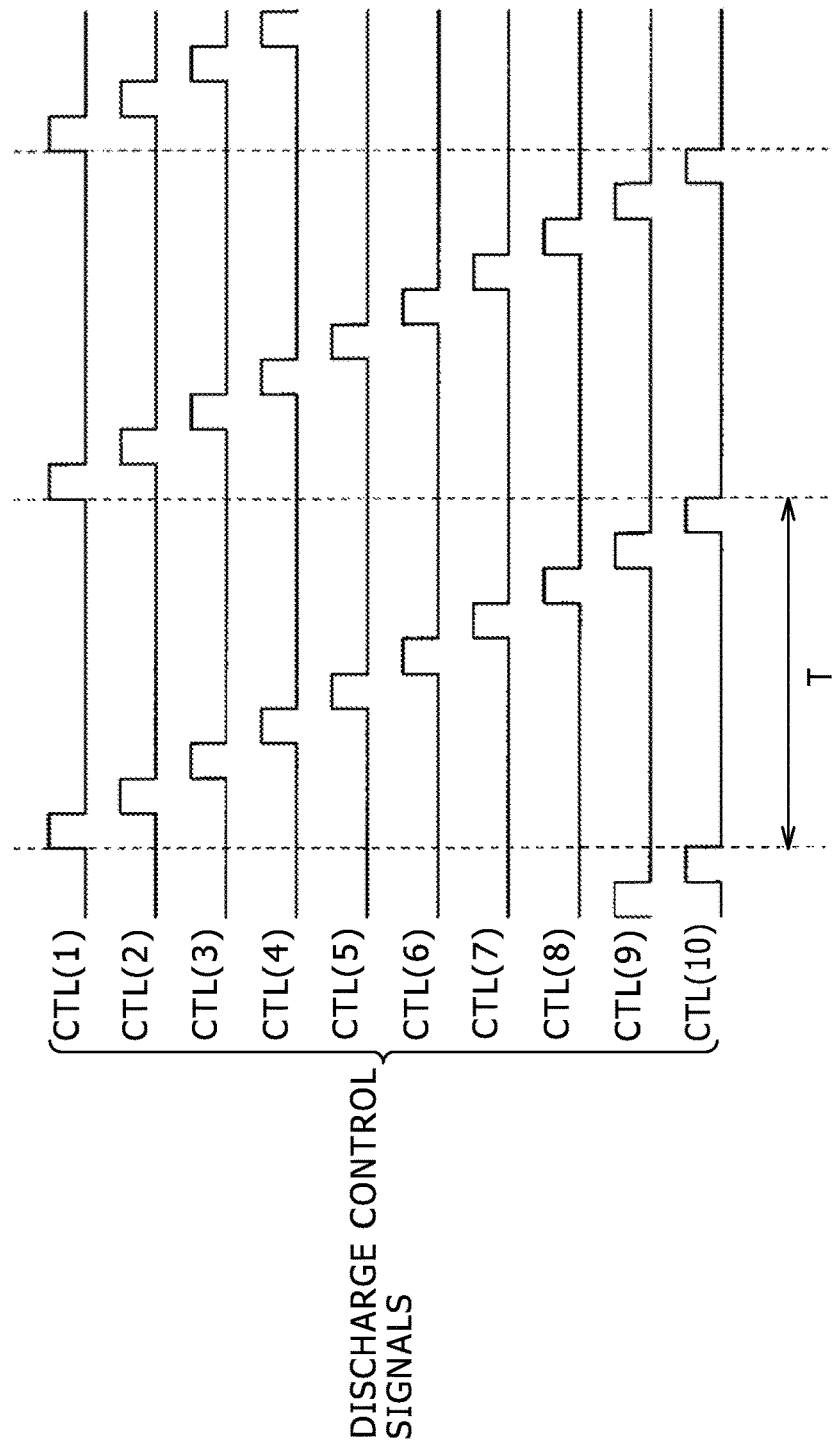
FIG. 4 is a timing waveform chart explaining an operation of a light emission controlling block shown in FIG. 1.

FIG. 4 shows timing waveform charts of the discharge control signals CTL(1) to CTL(10). The light emission controlling block 41, as shown in FIG. 4, generates the discharge control signals CTL(1) to CTL(10) in such a way that a pulse successively appears in the discharge control signals CTL(1) to CTL(10). Specifically, for example, the light emission controlling block 41 outputs a pulse as the discharge control signal CTL(1), and, at a timing of the end of the pulse, generates the next pulse as the discharge control signal CTL(2). Also, at a timing of the end of the pulse as the discharge control signal CTL(2), the light emission controlling block 41 generates the next pulse as the discharge control signal CTL(3). The timings of the generation of these pulses are synchronized with the line-sequential scanning in the display portion 30. Also, the light emission controlling block 41 repetitively carries out this operation every scanning period T of the line-sequential scanning in the display portion 30.

The boosting circuit 42 boosts a power source voltage VDD in the inside of the display device 1, thereby generating a boosted voltage VDD1. A DC-DC converter, for example, can be used in the boosting circuit 42.

The light emission driving blocks 60 (the light emission driving blocks 60(1) to 60(10)) drive the corresponding light emitting portions BL (the light emitting portions BL(1) to BL(10)) in accordance with the discharge control signals CTL (the discharge control signals CTL(1) to CTL(10)), respectively.

FIG. 5 shows a configuration of the light emission driving block 60 and the light emitting portion BL.

The light emitting portion BL is configured by connecting N LEDs 65(1) to 65(N) in series. Although in the case shown in FIG. 5, 32 LEDs (N=32) are used, the present disclosure is not limited thereto and thus 31 or less, or 33 or more LEDs may also be used. Although in this case, each of the light emitting portions BL is composed of LEDs, the present disclosure is not limited thereto. That is to say, instead of adopting this configuration, each of the light emitting portions BL may also be composed of Organic Light Emitting Diodes (OLEDs).

The light emission driving block 60 includes constant current sources 61 and 62, a capacitive element 63, and a transistor 64. The constant current source 61 is inserted between an output terminal of the boosting circuit 42 for generating and outputting a boosted voltage VDD1, and one end of the capacitive element 63. Also, the constant current source 61 supplies a predetermined current J1 from the boosting circuit 42 to the capacitive element 63. The predetermined current J1, for example, is set to 100 mA. The constant current source 62 is inserted between one end of the capacitive element 63, and an anode terminal of the LED 65(1) of the light emitting portion BL. Also, the constant current source 62 supplies a predetermined current J2 from the capacitive element 63 to the light emitting portion BL. The predetermined current J2, for example, is set to 1 A. The capacitive element 63 accumulates therein the electric charges with which the light emitting portion BL is caused to emit the light. One end of the capacitive element 63 is connected to the constant current sources 61 and 62, and the other end thereof is grounded. As a result, the capacitive element 63 is adapted to be charged with electricity by the constant current source 61, and the electric charges accumulated in the capacitive element 63 are adapted to be discharged by the constant current source 62. A voltage Vc at one end of the capacitive element 63, for example, is maintained at about 120 V. A capacitive element having a ripple current withstand of the predetermined current J2 or more (1 A or more in this case) is preferably used as the capacitive element 63. Also, 1,000 hF, for example, can be used as a capacitive value of the capacitive element 63. The transistor 64 is turned on or off, thereby controlling the light emission of the light emitting portion BL. The transistor 64, for example, is composed of an N-channel MOS-FET. In this case, a drain terminal of the transistor 64 is connected to a cathode electrode of the LED 65(N) of the light emitting portion BL, the discharge control signal CTL is supplied to a gate terminal of the transistor 64, and a source terminal thereof is grounded.

With this configuration, in the backlight driving portion 40, firstly, the light emission controlling block 41 generates the discharge control signals CTL(1) to CTL(10) in such a way that the light emitting portions BL(1) to BL(10) corresponding to the row of the pixels Pix, with which the image data on the display is rewritten in accordance with the line-sequential scanning in the display portion 30, respectively emit light. Also, in each of the light emission driving blocks 60(1) to 60(10), the capacitive element 63 is steadily charged with electricity based on the predetermined current J1 supplied from the constant current source 61. Also, the electric charges accumulated in the capacitive element 63 are discharged in the form of the predetermined current J2 of the constant current source 62 for a period of time (a discharge time period P) for which the transistor 64 is turned on in accordance with the discharge control signal CTL. As a result, for the discharge time period P, the LEDs 65(1) to 65(N) of the light emitting portion BL emit light. A ratio (light emission duty ratio) of a time of the discharge time period P (the period of time for the light emission in the light emitting portion BL) to a scanning period T of the display scanning, as shown in FIG. 4, is set at 10% in this case. It is noted that the light emission duty ratio is preferably set at 25% or less from a viewpoint of the measures taken to cope with the moving image blurring described above. In such a way, the plural light emitting portions BL(1) to BL(10) of the backlight 50 successively emit light in accordance with the discharge control signals CTL(1) to CTL(10), respectively.

Here, the constant current source 61 corresponds to a concrete example of "a current limiting section" in the first embodiment of the present disclosure. The LEDs 65(1) to 65(N) correspond to a concrete example of "light emitting elements" in the first embodiment of the present disclosure. The constant current source 62 corresponds to a concrete example of "a first constant current source" in the first embodiment of the present disclosure. The transistor 64 corresponds to a concrete example of "a switch" in the first embodiment of the present disclosure. Also, the boosting circuit 42 corresponds to a concrete example of "a power source" in the first embodiment of the present disclosure.

[Operation and Action]

Subsequently, a description will be given with respect to an operation and an action of the display device 1 according to the first embodiment of the present disclosure.

(Outline of Entire Operation)

Firstly, an outline of the entire operation of the display device 1 will be described with reference to FIG. 1. The control portion 10 supplies the video signal S to the display driving portion 20 in accordance with the video signal Sdisp supplied thereto from the outside, and also supplies the backlight control signal CBL to the backlight driving portion 40. Thus, the control portion 10 carries out the control in such a way that the display driving portion 20 and the backlight driving portion 40 are operated synchronously with each other. The display driving portion 20 drives the display portion 30 in accordance with the video signal S. The display portion 30 modulates the light emitted thereto from the backlight 50, thereby displaying thereon an image. In the backlight driving portion 40, the light emission controlling block 41 generates the discharge control signals CTL (the discharge control signals CTL(1) to CTL(10)) in accordance with the backlight control signal CBL. The boosting circuit 42 boosts the power source voltage VDD in the inside of the display device 1, thereby generating the boosted voltage VDD1. The light emission driving blocks 60 (the light emission driving blocks 60(1) to 60(10)) drive the light emitting portions BL (the light emitting portions BL(1) to BL(10)) of the backlight 50, respectively, in accordance with the discharge control signals CTL and the boosted voltage VDD1. The light emitting portions BL of the backlight 50 are driven by the backlight driving portion 40, thereby emitting light, respectively, independently of one another.

(Detailed Operation)

Next, a detailed operation of the light emission driving block 60 will be described.

Figure 6:
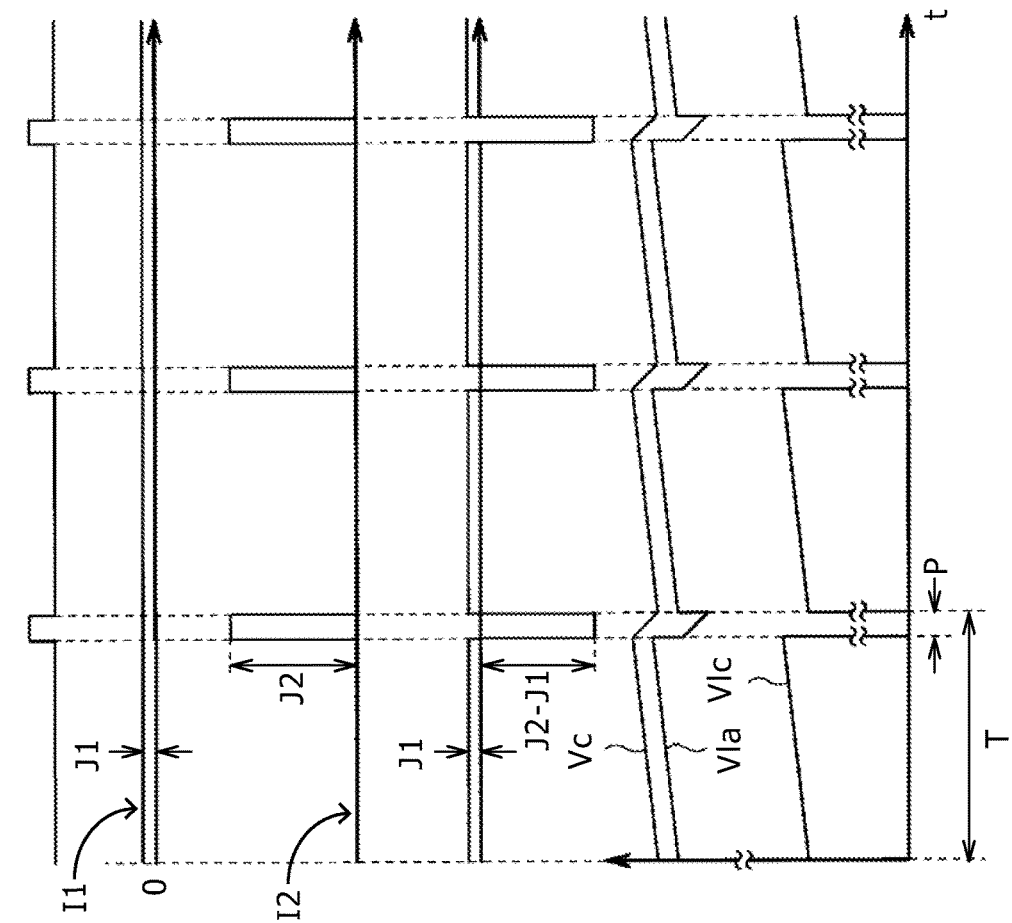
FIGS. 6A to 6E are timing waveform charts explaining an operation of the light emission driving block shown in FIG. 1.

FIGS. 6A to 6E explain operations of the light emission driving block 60: FIG. 6A shows a waveform of the discharge control signal CTL; FIG. 6B shows a waveform of the charging current I1 for the capacitive element 63; FIG. 6C shows a waveform of the discharging current I2 from the capacitive element 63; FIG. 6D shows a waveform of the charging current I1 minus the charging current I2; and FIG. 6E shows waveforms of the voltage Vc at one end of the capacitive element 63, an anode voltage V1a of the LED 65(1), and a cathode voltage V1c of the LED 65(N).

As shown in FIGS. 6A to 6E, the light emission driving block 60 drives the light emitting portion BL every scanning period T in accordance with the discharge control signal CTL. The scanning period T, for example, can be set to about 8.33 msec (=1/120 Hz). Hereinafter, the detailed operation thereof will be described.

The constant current source 61 steadily supplies the predetermined current J1 as the charging current I1 from the boosting circuit 42 to the capacitive element 63 (FIG. 6B). The transistor 64 is held in an OFF state for a period of time for which the discharge control signal CTL (FIG. 6A) is held at a low level, and is held in an ON state for a period of time for which the discharge control signal CTL is held at a high level. As a result, the constant current source 62 supplies the predetermined current J2 as the discharging current I2 from the capacitive element 63 to the light emitting portion BL for a period of time for which the transistor 64 is held in the ON state (the discharge time period P) (FIG. 6C).

As a result, for the period of time for which the discharge control signal CTL is held at the low level, the predetermined current J1 is caused to flow into the capacitive element 63 (FIG. 6D) to charge the capacitive element 63 with electricity, and thus the voltage Vc rises (FIG. 6E). At this time, in this case, although the transistor 64 is held in the OFF state because the discharge control signal CTL is held at the low level, a slight leakage current is caused to flow from the transistor 64. As a result, the anode voltage V1a of the LED 65(1) decreases from the voltage Vc by a voltage drop in the constant current source 62 due to the leakage current (FIG. 6E). Likewise, the cathode voltage V1c of the LED 65(N) decreases from the anode voltage V1a by a voltage drop in the LEDs 65(1) to 65(N) due to the leakage current (FIG. 6E).

On the other hand, for the period of time for which the discharge control signal CTL is held at the high level (the discharge time period P), a current (J2−J1) is discharged from the capacitive element 63 (FIG. 6D) to discharge the electric charges accumulated in the capacitive element 63, and thus the voltage Vc is decreased (FIG. 6E). At this time, the anode voltage V1a of the LED 65(1) decreases from the voltage Vc by a voltage drop in the constant current source 62 due to the predetermined current J2. Thus, the cathode voltage V1c of the LED 65(N) becomes 0 V because the transistor 64 is held in the ON state. Also, for the discharge time period P, the predetermined current J2 is caused to flow through the light emitting portion BL, whereby the light emitting portion BL emits light.

In such a way, in the light emission driving block 60, the direct-current electricity is steadily supplied to the capacitive element 63 by the constant current source 61 (the predetermined current J1) to charge the capacitive element 63 with electricity. As a result, as will be described later, a maximum value of the charging current I1 can be reduced as compared with the case where, for example, the capacitive element 63 is charged with electricity directly by the boosting circuit 42 without using the constant current source 61. In other words, since it is possible to reduce a load current for the boosting circuit 42 as a circuit in a preceding stage of the light emission driving block 60, it is possible to miniaturize the boosting circuit 42 as will be described later. In addition, since it is possible to reduce the maximum value of the charging current I1 in such a way, it is possible to lengthen the life of the capacitive element 63.

Next, a relationship between the predetermined currents J1 and J2 will be described. Preferably, the predetermined currents J1 and J2 are set so as to fulfill a relationship indicated by Expression (1).

$$T \times J1 \geq TP \times J2 \quad (1)$$

TP in Expression (1) is the time of the discharge time period P. A left-hand member ($T \times J1$) in Expression (1) represents the amount of electric charges with which the capacitive element 63 is charged in the form of the charging current I1 for a time T (the scanning period T). On the other hand, a right-hand member (TP×J2) represents the amount of electric charges which are discharged from the capacitive element 63 in the form of the discharging current I2 for one period of the scanning period T. That is to say, Expression (1) represents that for one period of the scanning period T, the amount of electric charges with which the capacitive element 63 is charged in the form of the charging current I1 is equal to or more than the amount of electric charges which are discharged from the capacitive element 63 in the form of the discharging current I2.

The predetermined currents J1 and J2 are set so as to fulfill the relationship of Expression (1), whereby the voltage Vc can be maintained at about the boosted voltage VDD1. Specifically, for example, when the amount of electric charges with which the capacitive element 63 is charged in the form of the charging current I1 is equal to the amount of electric charges which are discharged from the capacitive element 63 in the form of the discharging current I2 in Expression (1), even if the charging and the discharging for the capacitive element 63 are repetitively carried out, the voltage level of the voltage Vc can be maintained. Therefore, if the voltage Vc is set to about the boosted voltage VDD1 in the first place, the voltage VDD1 can be maintained. When the amount of electric charges with which the capacitive element 63 is charged in the form of the charging current I1 is more than the amount of electric charges which are discharged from the capacitive element 63 in the form of the discharging current I2, for example, the voltage Vc can be made to rise right after turning on the power source. When the voltage Vc rises up to about the boosted voltage VDD1, the constant current source 61 carries out the charging operation for the capacitive element 63 in such a way that the voltage Vc does not exceed the boosted voltage VDD1. Therefore, the voltage Vc is maintained at about the boosted voltage VDD1.

Next, the power source unit for flash described in Patent Document 1 will be discussed, and then the action of the display device 1 of the first embodiment will be described in contrast with the power source unit for flash.

It is not described in Patent Document 1 that the constant current source is used when the capacitor is charged with electricity. Therefore, it is thought that the boosting circuit for charging the capacitor with electricity functions as the constant current source to charge the capacitor with electricity. In this case, when the voltage of the capacitor (corresponding to the voltage Vc in the display device 1 in the first embodiment) is reduced through the discharging, the boosting circuit supplies larger current to the capacitor to charge the capacitor with electricity. When this method is applied to the display device 1 of the first embodiment, the boosting circuit supplies the charging current like a ripple to the capacitor synchronously with the light emitting operation of the light emitting portion BL. At this time, a maximum value of the charging current like the ripple becomes larger than the charging current when the same amount of electric charges is steadily supplied to the capacitor by the constant current source. That is to say, when no constant current source is used, the boosting circuit needs to be configured so as to be capable of supplying larger current. In this case, it is feared that the boosting circuit, for example, is increased in size and thus the entire display device grows in size. In addition, when a boosting circuit having a high current supplying ability is used, it is also feared that the cost of the components of the boosting circuit is increased. Moreover, when the boosting circuit using the current like the ripple as the current load is composed of a DC-DC converter using a transformer, there is also the possibility that the boosting circuit generates an abnormal noise because magnetostriction or the like is generated due to the load fluctuation, depending on the condition. When the generation of the abnormal noise is not desirable from a viewpoint of commercialization of product, for example, it becomes necessary to take a mechanical reinforcement measure for inhibiting the abnormal noise from being generated. As a result, there is the possibility that the size of the boosting circuit is increased.

On the other hand, in the display device 1 of the first embodiment, the capacitive element 63 is steadily charged with electricity by using the constant current source. As a result, since the charging current can be made small, the current supplying ability of the boosting circuit 42 in the preceding stage can be reduced, and the performance required for the boosting circuit 42 can be reduced. Also, along with this, the size and circuit scale of the boosting circuit 42 can be reduced, or the consumed current can be reduced. In addition, since the boosting circuit having the low performance can be used in such a way, the cost of the parts or components of the boosting circuit can be reduced. Moreover, since the load current for the boosting circuit 42 becomes the current (direct-current electricity) of the constant current source 61, the possibility that the abnormal noise is generated can be reduced.

[Effects]

As described above, in the display device of the first embodiment, since the capacitive element is steadily charged with electricity by using the constant current source, it is possible to reduce the load current for the boosting circuit. Therefore, it is possible to reduce the size of the boosting circuit and to miniaturize the device.

In addition, in the display device of the first embodiment, since the capacitive element is charged with electricity by using the constant current source, it is possible to reduce the maximum value of the charging current for the capacitive element, and it is possible to lengthen the life of the capacitive element.

In addition, in the display device of the first embodiment, since the capacitive element is charged with electricity by using the direct-current electricity supplied from the constant current source, the load current for the boosting circuit becomes the direct-current electricity, and it is possible to reduce the possibility that the boosting circuit generates abnormal noises.

MODIFICATION EXAMPLE 1-1

Figure 7:
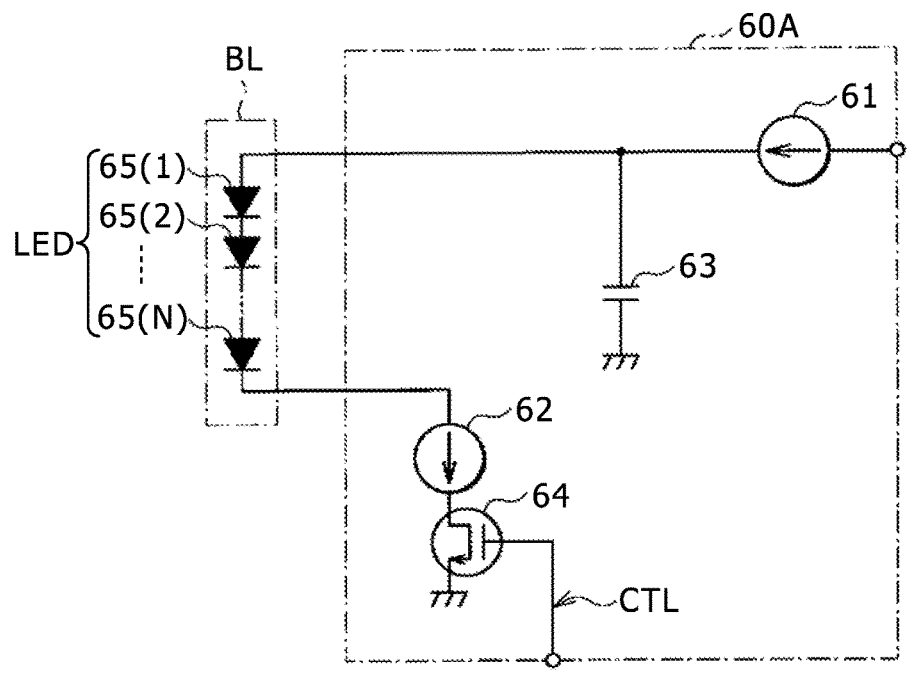
FIG. 7 is a circuit diagram showing a configuration of a light emission driving block according to a modification of the first embodiment.

In the display device 1 of the first embodiment, the constant current source 62 is inserted between the capacitive element 63 and the light emitting portion BL, but the present disclosure is not limited thereto. Instead of adopting this configuration, for example, the constant current source 62 may also be inserted between the light emitting portion BL and the transistor 64 as shown in FIG. 7.

MODIFICATION EXAMPLE 1-2

Figure 8:
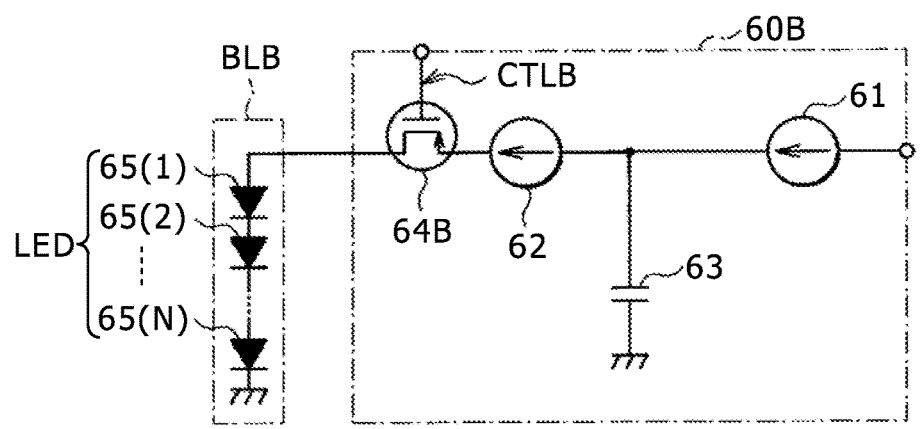
FIG. 8 is a circuit diagram showing a configuration of a light emission driving block and a light emitting portion according to another modification of the first embodiment.

In the display device 1 of the first embodiment, the transistor 64 is inserted between the light emitting portion BL and the grounding, but the present disclosure is not limited thereto. Instead of adopting this configuration, for example, a transistor 64B may be inserted between the constant current source 62 and a light emitting portion BLB as shown in FIG. 8. In this case, for example, a P-channel MOS-FET can be applied to the transistor 64B.

MODIFICATION EXAMPLE 1-3

In the display device 1 of the first embodiment, the backlight driving portion 40 drives the light emitting portions BL(1) to BL(10) in such a way that the light emitting portions BL(1) to BL(10) do not emit light at the same time, but the present disclosure is not limited thereto. Instead of adopting this configuration, a configuration may also be adopted such that some of the light emitting portions BL(1) to BL(10) emit light at the same time. Hereinafter, details thereof will be described.

Figure 9A:
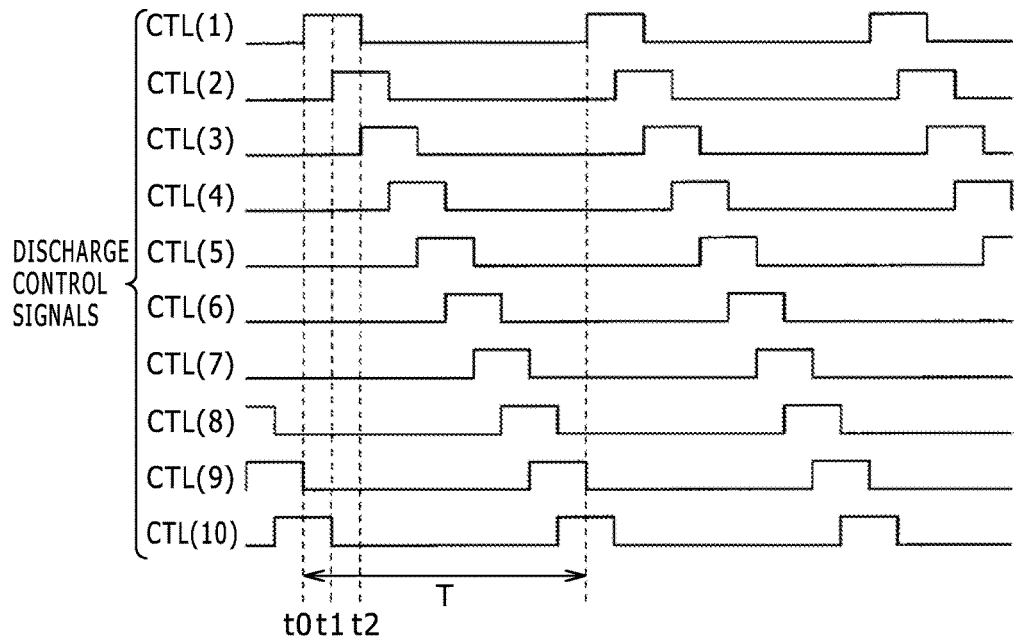
FIGS. 9A and 9B are timing waveform charts explaining an operation of a light emission controlling block according to still another modification of the first embodiment.
Figure 9B:
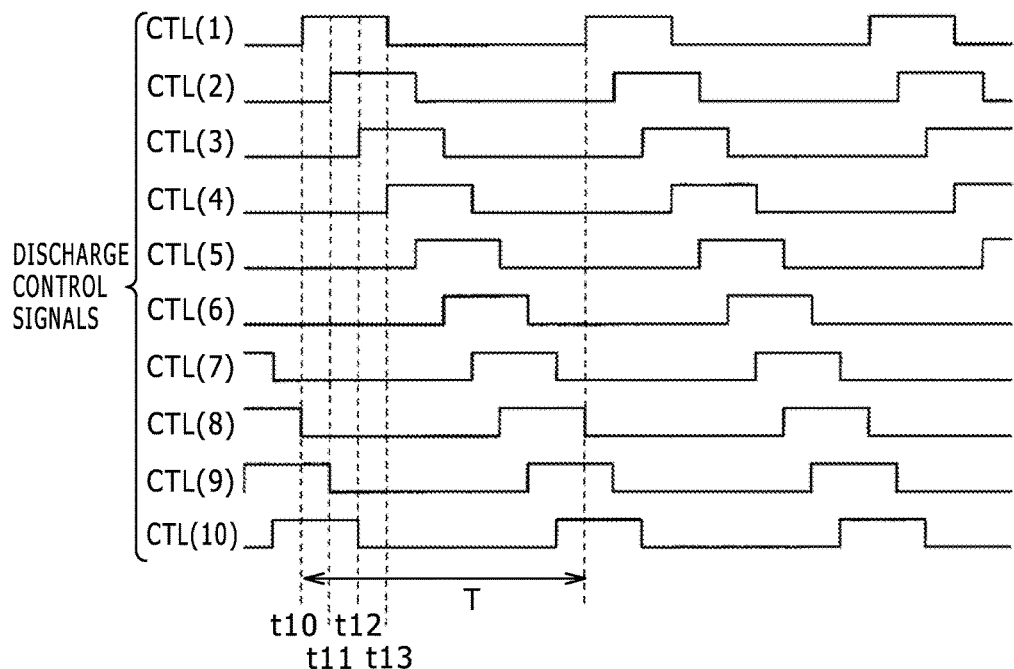

FIGS. 9A and 9B respectively explain an operation of the light emission controlling block 41: FIG. 9A shows the case where the light emission controlling block 41 carries out the control in such a way that two of the light emitting portions BL emit light at the same time; and FIG. 9B shows the case where the light emission controlling block 41 carries out the control in such a way that three of the light emitting portions BL emit light at the same time.

In FIG. 9A, the light emission controlling block 41 firstly causes the voltage of the discharge control signal CTL(1) to change from the low level to the high level at a timing to. Next, the light emission controlling block 41 causes the voltage of the discharge control signal CTL(2) to change from the low level to the high level at a timing t1. Also, the light emission controlling block 41 causes the voltage of the discharge control signal CTL(1) to change from the high level to the low level and causes the voltage of the discharge control signal CTL(3) to change from the low level to the high level at a timing t2. The light emission controlling block 41 generates the discharge control signals CTL(1) to CTL(10) in such a way. In the method shown in FIG. 9A, two of the discharge control signals CTL become the high level at the same time. As a result, the backlight driving portion 40 drives the backlight 50 in such a way that two of the light emitting portions BL emit light at the same time.

In FIG. 9B, the light emission controlling block 41 firstly causes the voltage of the discharge control signal CTL(1) to charge from the low level to the high level at a timing t10. Next, the light emission controlling block 41 causes the voltage of the discharge control signal CTL(2) to change from the low level to the high level at a timing t11. Next, the light emission controlling block 41 causes the voltage of the discharge control signal CTL(3) to change from the low level to the high level at a timing t12. Next, the light emission controlling block 41 causes the voltage of the discharge control signal CTL(1) to change from the high level to the low level and causes the voltage of the discharge control signal CTL(4) to change from the low level to the high level at a timing t13. The light emission controlling block 41 generates the discharge control signals CTL(1) to CTL(10) in such a way. In the method shown in FIG. 9B, three of the discharge control signals CTL become the high level at the same time. As a result, the backlight driving portion 40 drives the backlight 50 in such a way that three of the light emitting portions BL emit light at the same time.

In the display device according to Modification Examples 1-3, the backlight driving portion 40 drives the backlight 50 in such a way that the light emission time of each of the light emitting portions BL is lengthened, whereby plural light emitting portions BL emit light at the same time. As a result, the boosting circuit 42 needs to supply more current in order to charge the capacitive element 63 of each of the light emission driving portions 60 with electricity. In this case as well, in each of the light emission driving portions 60, since the capacitive element 63 is charged with electricity by using the constant current source 61 as described above, the load current for the boosting circuit 42 becomes smaller than that in the case where constant current source 61 is not provided. In this way, in the display device according to Modification Examples 1-3, the load current for the boosting circuit can be made small even when plural light emitting portions BL are caused to emit light at the same time. Therefore, it is possible to reduce the size of the boosting circuit, and it is possible to miniaturize the device.

MODIFICATION EXAMPLE 1-4

The capacitive element 63 is charged with electricity by using the constant current source 61 according to the first embodiment, but the present disclosure is not limited thereto. That is to say, for example, the capacitive element 63 may also be charged with electricity by using another constant current source. Hereinafter, details thereof will be described.

Figure 10:
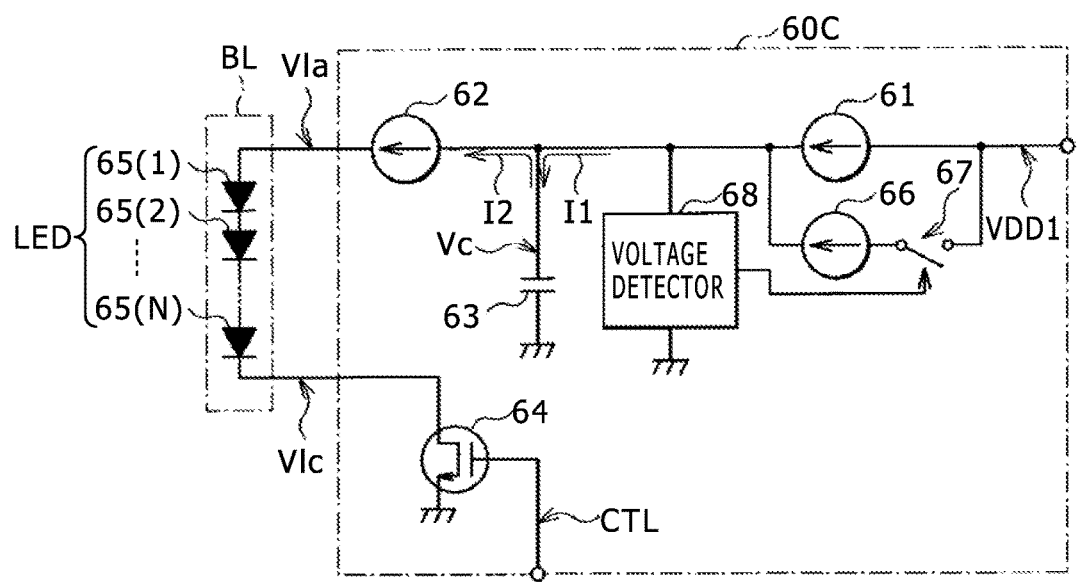
FIG. 10 is a circuit diagram showing a configuration of a light emission driving block according to yet another modification of the first embodiment.

FIG. 10 shows a configuration of a light emission driving block 60C according to Modification Examples 1-4 together with the light emitting portion BL. The light emission driving block 60C includes a constant current source 66, a switch 67, and a voltage detector 68. The constant current source 66 supplies a predetermined current J1P from the boosting circuit 42 to the capacitive element 63. The switch 67 is connected in series with the constant current source 66, and controls ON and OFF in supplying current to the capacitive element 63 by the constant current source 66. The voltage detector 68 has a function of detecting the voltage Vc, turning ON the switch 67 when the voltage Vc is lower than a predetermined threshold voltage Vth, and turning OFF the switch 67 when the voltage Vc is higher than the predetermined threshold voltage Vth.

Figure 11:
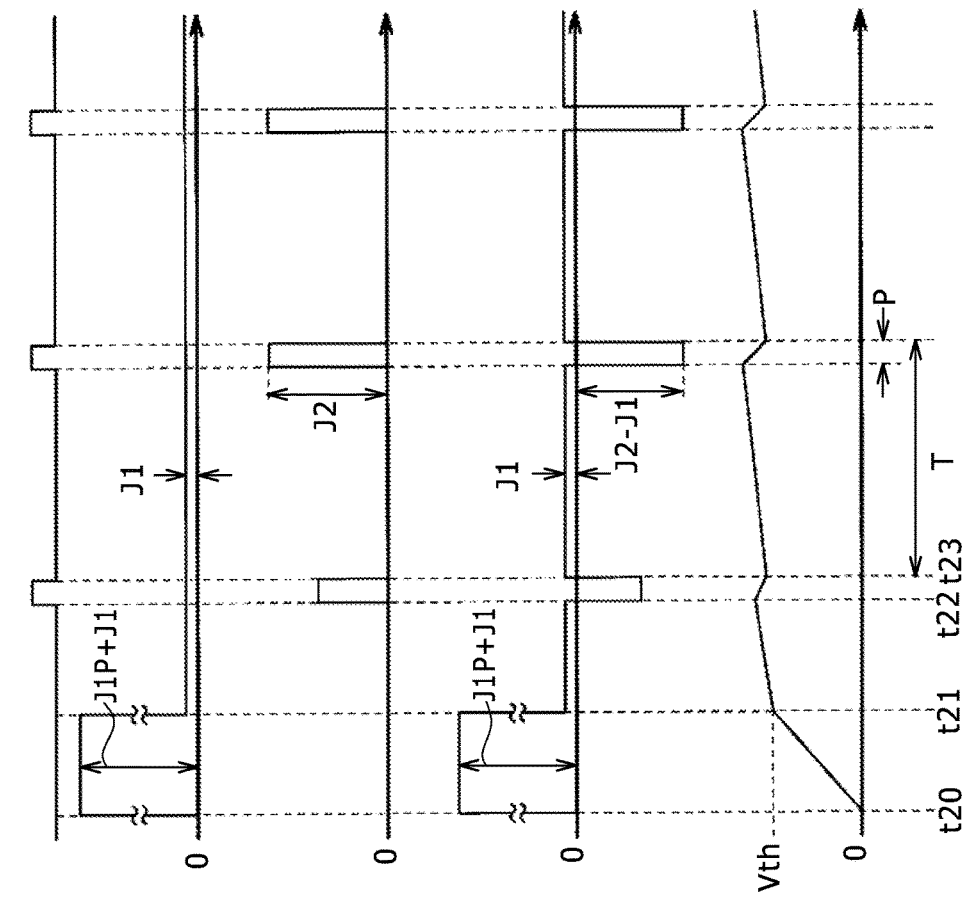
FIGS. 11A to 11E are timing waveform charts explaining an operation of the light emission driving block shown in FIG. 10.

FIGS. 11A to 11E explain operations of the light emission driving block 60C according to Modification Examples 1-4 right after turning on the power source: FIG. 11A shows a waveform of the discharge control signal CTL; FIG. 11B shows a waveform of the charging current I1; FIG. 11C shows a waveform of the discharging current I2; FIG. 11D shows a waveform of the charging current I1 minus the discharging current I2; and FIG. 11E shows a waveform of the voltage Vc.

At a timing t20, right after turning on the power source, since the capacitive element 63 is not sufficiently charged with electricity and thus the voltage Vc is lower than the threshold voltage Vth, the voltage detector 68 carries out the control in such a way that the switch 67 is turned on. As a result, the charging current I1 becomes equal to a current obtained by adding the predetermined current J1P supplied from the constant current source 66 to the predetermined current J1 supplied from the constant current source 61 (the current J1+the current J1P) (FIG. 11B), and thus the voltage Vc quickly rises (FIG. 11E). Also, at a timing t21, when the voltage Vc becomes higher than the threshold voltage Vth, the voltage detector 68 carries out the control in such a way that the switch 67 is turned off. As a result, the charging current I1 becomes equal to the predetermined current J1 supplied from the constant current source 61. After that, the voltage Vc rises in accordance with the predetermined current J1 (FIG. 11E). Also, at a timing t22, when the transistor 64 is turned on in accordance with the discharge control signal CTL, the constant current source 62 desires to cause the predetermined current J2 to flow. In this case, however, since the voltage Vc is not sufficiently high, the constant current source 62 cannot cause the predetermined current J2 to flow, and thus the discharging current I2 becomes slightly less than the predetermined current J2 (FIG. 11C). Also, at and after a timing t23, the light emission driving block 60C carries out the operation in the same manner as that in the case of the first embodiment described above (FIGS. 6A to 6E).

MODIFICATION EXAMPLE 1-5

Figure 12:
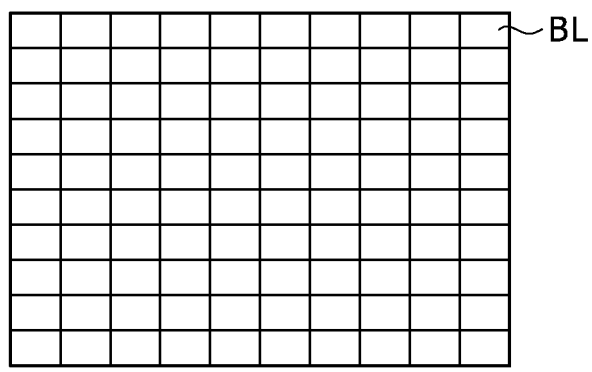
FIG. 12 is an explanatory diagram showing a structure of a backlight according to a further modification of the first embodiment.

The plural light emitting portions BL are disposed in parallel relation to one another in the line-sequential scanning direction in the display portion 30 according to the first embodiment, but the present disclosure is not limited thereto. Instead of adopting this configuration, for example, the plural light emitting portions BL may also be disposed in a matrix as shown in FIG. 12. In this case, for example, the light emission of each of the light emitting portions BL may also be controlled in accordance with the data on the image displayed on the display portion 30. Specifically, for example, the light emitting portions BL corresponding to the area in which a black color is displayed are all turned off, thereby making it possible to enhance the contrast of the display picture. In addition, this operation may also be combined with the operation in the first embodiment described above, and thus the light emission of each of the light emitting portions BL may also be controlled in accordance with the image data while each of the light emitting portions BL are scanned and driven so as to successively emit light synchronously with the line-sequential scanning in the display portion 30.

In this case, the light emission driving blocks 60 drive the plural light emitting portions BL in such a way that the plural light emitting portions BL emit light at the same time. Therefore, the boosting circuit 42 in the preceding stage of the light emission driving blocks 60 needs to supply much current in order to charge the capacitive element 63 of each of the light emission driving blocks 60 with electricity. In this case as well, in each of the light emission driving blocks 60, the capacitive element 63 is charged with electricity by using the constant current source 61, thereby making it possible to reduce the load current for the boosting circuit 42. Therefore, it is possible to reduce the size of the boosting circuit 42, and it is possible to miniaturize the device.

MODIFICATION EXAMPLE 1-6

The plural light emitting portions BL are provided according to the first embodiment described above, but the present disclosure is not limited thereto. That is to say, instead of adopting this configuration, only one light emitting portion BL having the size corresponding to the display screen of the display portion 30 may be provided.

Figure 13:
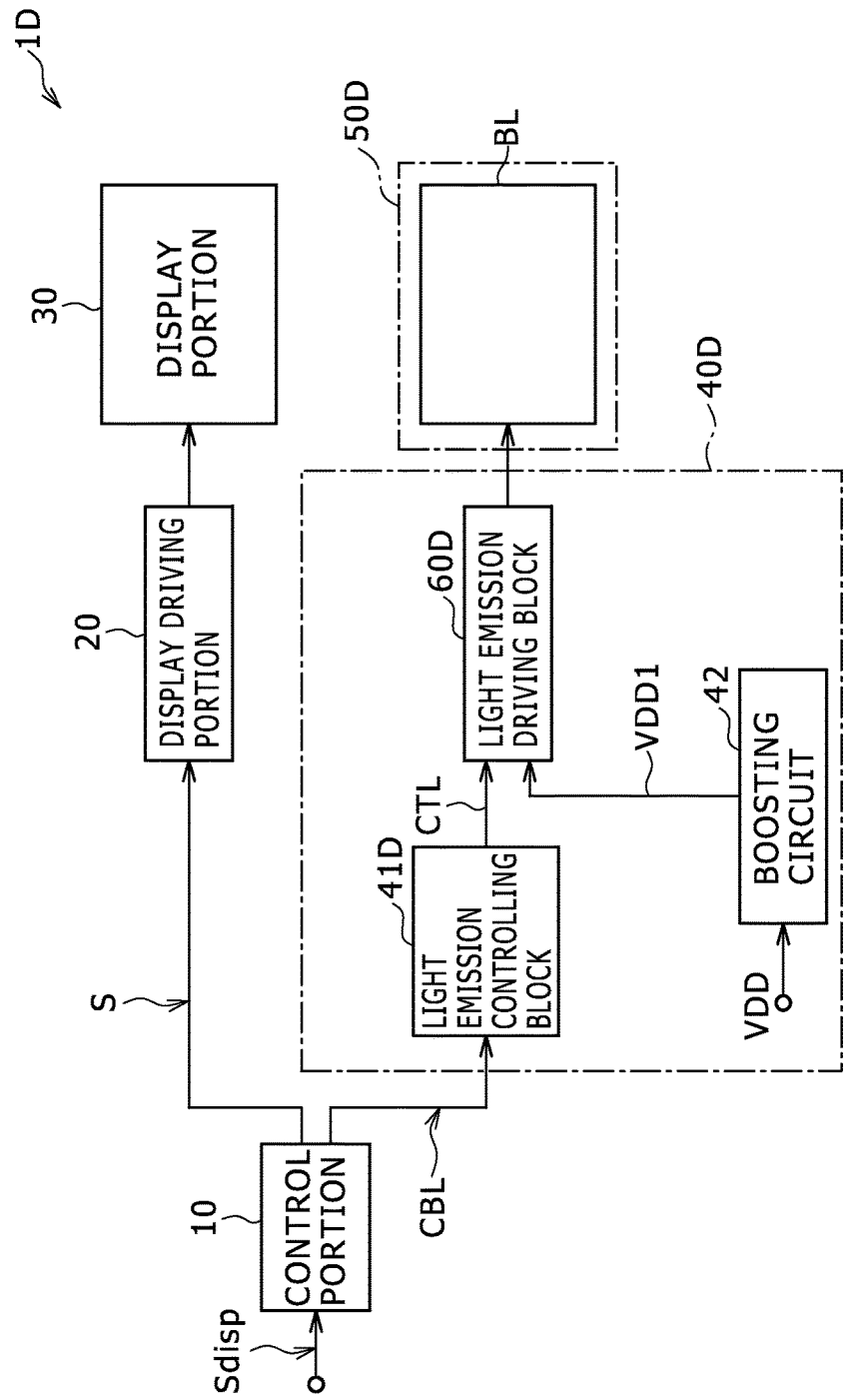
FIG. 13 is a block diagram showing a configuration of a display device according to an even further modification of the first embodiment.

FIG. 13 shows a configuration of a display device 1D according to Modification Examples 1-6 of the first embodiment. The display device 1D includes a backlight 50D and a backlight driving portion 40D. The backlight 50D includes a light emitting portion BL having a size corresponding to the display screen of the display portion 30. The backlight driving portion 40D includes a light emission driving block 60D and a light emission controlling block 41D. The light emission driving block 60D drives the large light emitting portion BL of the backlight 50D. A circuit configuration of the light emission driving block 60D is such that the predetermined current J1 supplied from the constant current source 61, the predetermined current J2 supplied from the constant current source 62, and a capacitance value of the capacitive element 63, for example, are each decupled in the light emission driving block 60 (FIG. 5) according to the first embodiment described above. The light emission controlling block 41D generates a pulse synchronous with the line-sequential scanning in the display portion 30, and outputs the pulse as the discharge control signal CTL. It is noted that although the backlight 50D including only one light emitting portion BL having the size corresponding to the display screen of the display portion 30 is used in this case, but the present disclosure is not limited thereto. Instead of adopting this configuration, for example, a configuration may also be adopted such that the backlight 50 (FIG. 1) according to the first embodiment described above is used, and that the backlight driving portion 40D drive the 10 light emitting portions BL(1) to BL(10) as a cluster at the same time.

With the display device 1D according to Modification Examples 1-6 of the first embodiment, for example, the line-sequential scanning is carried out in the display portion 30, and the light emitting portion BL is caused to emit the light for a short light emission time at a timing at which the data on the display on the entire display surface is rewritten, whereby it is possible to reduce the moving image blurring, and it is possible to enhance the image quality. In this case, since the light emission driving block 60D drives the large light emitting portion BL, the boosting circuit 42 in the preceding stage of the light emission driving block 60D needs to supply much current in order to charge the capacitive element 63 of the light emission driving block 60D with electricity. In this case as well, in each of the light emission driving portions 60D, the capacitive element 63 is charged with electricity by using the constant current source 61, thereby making it possible to reduce the load current for the boosting circuit 42. Therefore, it is possible to reduce the size of the boosting circuit 42, and it is possible to miniaturize the device.

2. Second Embodiment

Next, a display device 2 according to a second embodiment of the present disclosure will be described. The display device 2 according to the second embodiment is configured such that a bias voltage is applied to the other end of a capacitive element of a light emission driving block. It is noted that the constituent elements which are substantially the same as those in the display device 1 according to the first embodiment of the present disclosure are designated by the same reference symbols, respectively, and a description thereof is suitably omitted.

Figure 14:
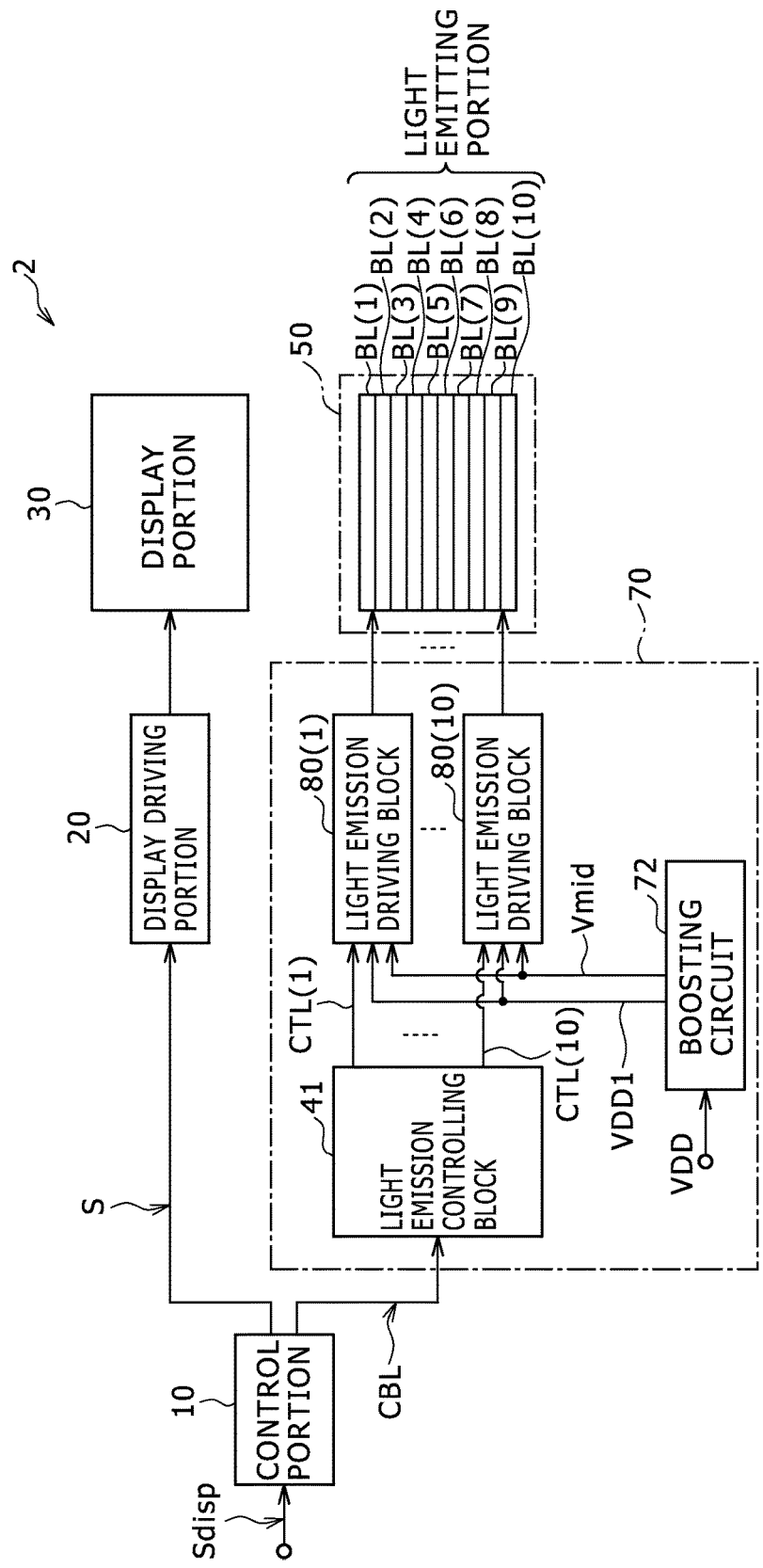
FIG. 14 is a block diagram showing a configuration of a display device according to a second embodiment of the present disclosure.

FIG. 14 shows a configuration of the display device according to the second embodiment of the present disclosure. The display device 2 includes a backlight driving portion 70. The backlight driving portion 70 includes a boosting circuit 72 and plural light emission driving blocks (the light emission driving blocks 80(1) to 80(10)) corresponding to the light emitting portions BL, respectively. The boosting circuit 72 generates not only a boosted voltage VDD1 but also a voltage Vmid associated with the boosted voltage VDD1, and supplies both of the boosted voltage VDD1 and the voltage Vmid to each of the light emission driving blocks 80.

Figure 15:
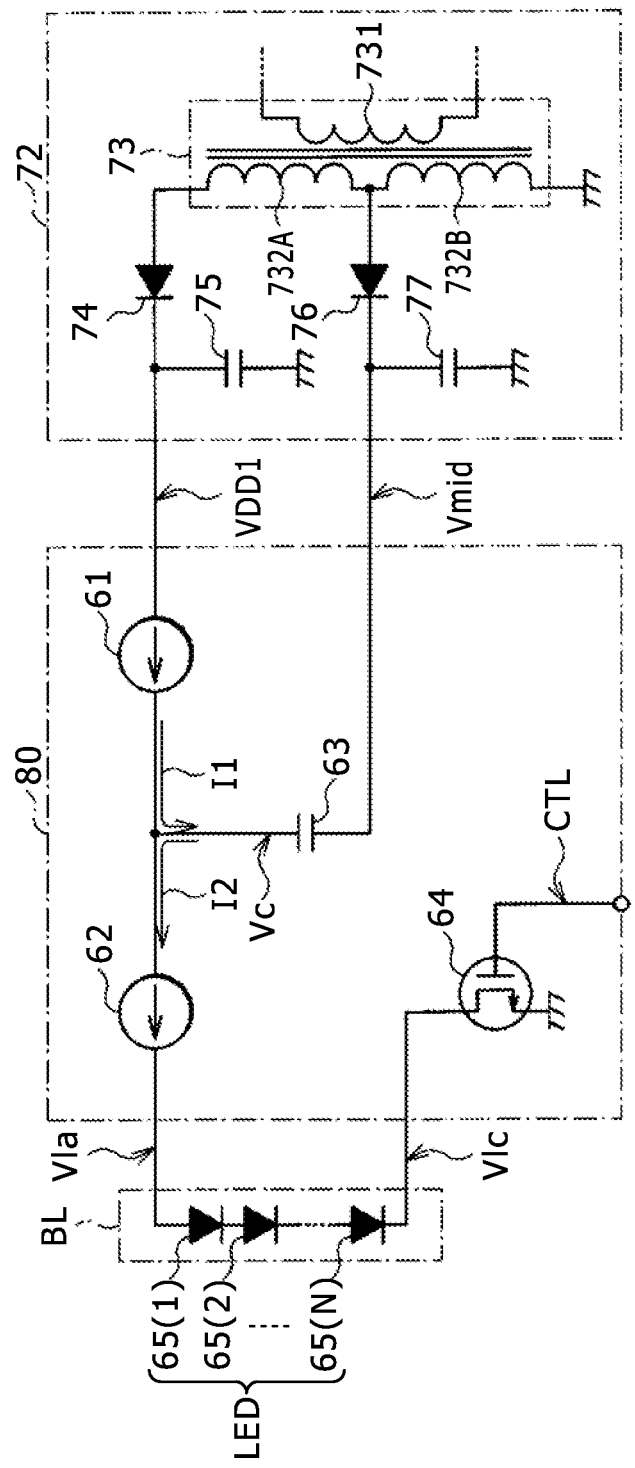
FIG. 15 is a circuit diagram showing a configuration of a main portion of a boosting circuit, a light emission driving block, and a light emitting portion shown in FIG. 14.

FIG. 15 shows a configuration of a main portion of the boosting circuit 72, the light emission driving block 80, and the light emitting portion BL. The light emission driving block 80 is configured so as to be capable of supplying the bias voltage to the other end of the capacitive element 63. The boosting circuit 72 is composed of a DC-DC converter using a transformer in this case. The boosting circuit 72 includes a transformer 73 having a primary winding 731 and secondary windings 732A and 732B, diodes 74 and 76, and capacitive elements 75 and 77. An anode terminal of the diode 74 is connected to one end of the secondary winding 732A, and a cathode terminal thereof is connected to the constant current source 61 of the light emission driving block 80. The capacitive element 75 is inserted between the cathode terminal of the diode 74 and the grounding. An anode terminal of the diode 76 is connected to each of the other end of the secondary winding 732A and one end of the secondary winding 732B, and a cathode terminal thereof is connected to the other end of the capacitive element 63 of the light emission driving block 80. The capacitive element 77 is inserted between the cathode terminal of the diode 76 and the grounding. The other end of the secondary winding 732B is grounded.

With this configuration, in the boosting circuit 72, when an alternating-current voltage is applied across opposite ends of the primary winding 731, an alternating-current voltage corresponding to a winding ratio of the primary winding 731 to the secondary windings 732A and 732B is developed at one end of the secondary winding 732A and one end of the secondary winding 732B. After the alternating-current voltage output from one end of the secondary winding 732A is rectified by the diode 74, the resulting voltage is smoothed by the capacitive element 75 and then supplied as the boosted voltage VDD1 to the constant current source 61 of the light emission driving block 80. In addition, after the alternating-current voltage output from one end of the secondary winding 732B is rectified by the diode 76, the resulting voltage is smoothed by the capacitive element 77 and then supplied as the voltage Vmid to the other end of the capacitive element 63 of the light emission driving block 80.

Next, a withstand voltage of the capacitive element 63 will be described. With regard to the capacitive element, in general, a maximum value of a difference of an electric potential, which can be applied, between opposite ends of the capacitive element is regulated as a withstand voltage. Since the capacitive element showing a high withstand voltage has a mechanism for withstanding such a large electric potential difference, in general, the size of the capacitive element becomes large. So, in the display device 2, the bias voltage (the voltage Vmid) is applied to the other end of the capacitive element 63, thereby preventing a large voltage from being applied across the opposite ends of the capacitive element 63. As a result, in the display device 2, it is possible to reduce the size of the capacitive element 63. Hereinafter, details thereof will be described. It is noted in the following description that an amount of voltage drop in each of the diodes 74, 76, and the constant current source 61 is set to 0 V for the sake of convenience of the description.

The voltage Vmid generated by the boosting circuit 72 is proportional to the boosted voltage VDD1. Specifically, the voltage Vmid is indicated by Expression (2), where N2A is the number of windings of the secondary winding 732A, and N2B is the number of windings of the secondary winding 732B.

$$V\mathrm{mid}=N2B/(N2A+N2B)\times VDD1 \quad (2)$$

The boosting circuit 72 applies the boosted voltage VDD1 and the voltage Vmid to the light emission driving block 80. Although the voltage developed across the opposite ends of the capacitive element 63 of the light emission driving block 80 is slightly changed depending on both of the charging current I1 and the discharging current I2, it does not exceed a voltage (VDD1−Vmid). Therefore, for example, the number N2A of windings of the secondary winding 732A and the number N2B of windings of the secondary winding 732B are set in such a way that the voltage (VDD1−Vmid) becomes equal to or lower than the withstand voltage of the capacitive element 63. As a result, the voltage exceeding the withstand voltage is prevented from being applied across the opposite ends of the capacitive element 63.

The number N2A of windings of the secondary winding 732A and the number N2B of windings of the secondary winding 732B are suitably set, whereby the capacitive element having a small size can be used as the capacitive element 63.

As described above, in the display device of the second embodiment, since the bias voltage is supplied to the capacitive element, it is possible to reduce the voltage applied across the opposite ends of the capacitive element, and thus it is possible to reduce the size of the capacitive element.

In addition, in the display device of the second embodiment, since the bias voltage for the capacitive element is generated from the intermediate tap of the transformer in the boosting circuit, it is possible to generate the bias voltage with the simple configuration.

Other effects of the second embodiment are the same as those in the case of the first embodiment described above.

Figure 16:
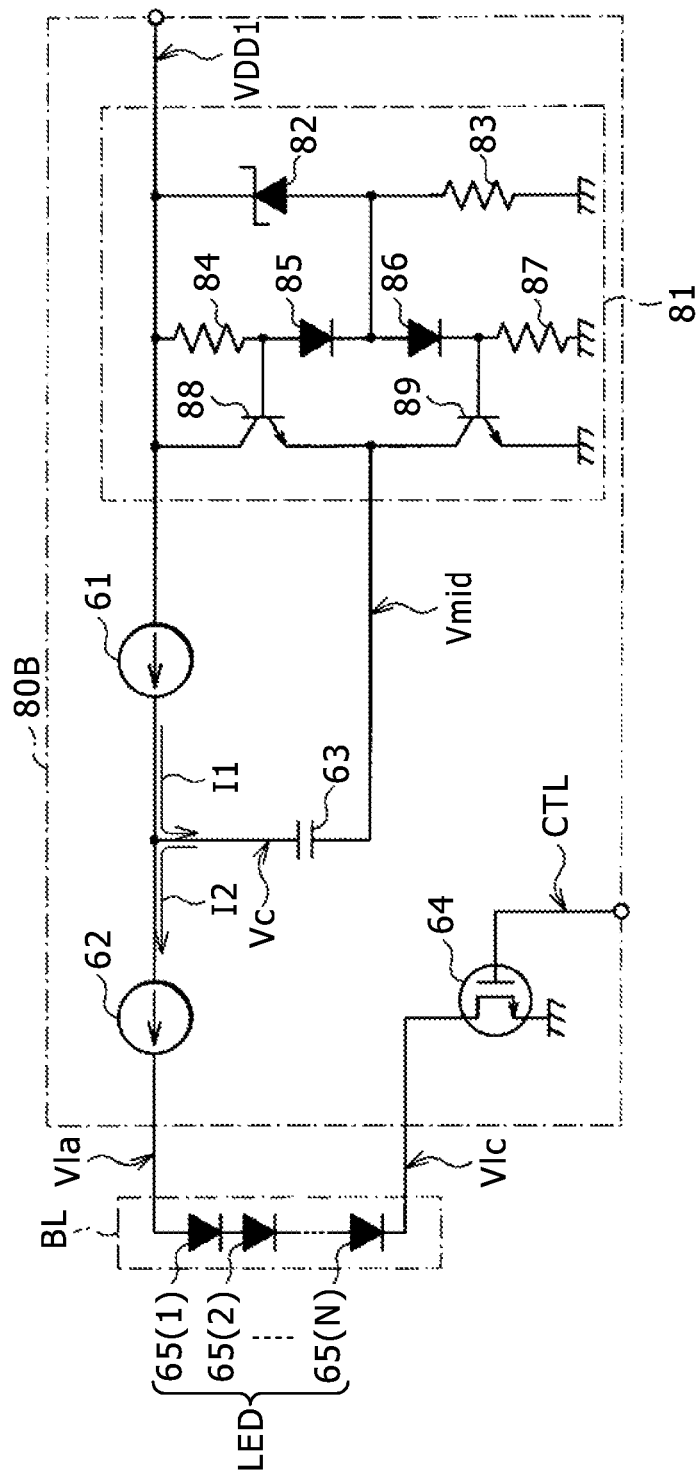
FIG. 16 is a circuit diagram showing a configuration of a light emission driving block and a light emitting portion according to a modification of the second embodiment.

The boosting circuit 72 generates the bias voltage (the voltage Vmid) in the display device 2 of the second embodiment described above, but the present disclosure is not limited thereto. Instead of adopting this configuration, for example, a configuration may also be adopted such that a bias circuit 81 for generating the bias voltage is separately provided as shown in FIG. 16. The bias circuit 81 generates the voltage Vmid based on the boosted voltage VDD1, and supplies the voltage Vmid thus generated to the other end of the capacitive element 63. The bias circuit 81 includes a zener diode 82, resistive elements 83, 84 and 87, diodes 85 and 86, an NPN transistor 88, and a PNP transistor 89. The boosted voltage VDD1 is supplied to a cathode terminal of the zener diode 82, and an anode terminal thereof is connected to one end of the resistive element 83. One end of the resistive element 83 is connected to the anode terminal of the zener diode 82, and the other end thereof is grounded. The boosted voltage VDD1 is supplied to one end of the resistive element 84, and the other end thereof is connected to the anode terminal of the diode 85. The anode terminal of the diode 85 is connected to the other end of the resistive element 84, and a cathode terminal thereof is connected to an anode terminal of the diode 86 and is also connected to the anode terminal of the zener diode 82. The anode terminal of the diode 86 is connected to the anode terminal of the zener diode 82 and is also connected to the cathode terminal of the diode 85. Also, a cathode terminal of the diode 86 is connected to one end of the resistive element 87. One end of the resistive element 87 is connected to the cathode terminal of the diode 86, and the other end thereof is grounded. The boosted voltage VDD1 is supplied to a collector terminal of the NPN transistor 88, and a base terminal thereof is connected to the anode terminal of the diode 85. Also, an emitter terminal of the NPN transistor 88 is connected to an emitter terminal of the PNP transistor 89 and is also connected to the other end of the capacitive element 63. The emitter terminal of the PNP transistor 89 is connected to the emitter terminal of the NPN transistor 88, and is also connected to the other end of the capacitive element 63. Also, a base terminal of the PNP transistor 89 is connected to the cathode terminal of the diode 86, and a collector terminal thereof is grounded. It is noted that, although not illustrated in FIG. 16, for example, a capacitive element for stabilizing the voltage Vmid may also be inserted between the other end of the capacitive element 63 and the grounding.

3. Third Embodiment

Next, a display device 3 according to a third embodiment of the present disclosure will be described. The display device 3 according to the third embodiment is configured in such a way that the predetermined current J2 supplied from the constant current source 62 of the light emission driving block 60 in the first embodiment can be changed. It is noted that the constituent elements which are substantially the same as those in the display device 1 according to the first embodiment described above are designated by the same reference symbols, respectively, and a description thereof is suitably omitted.

Figure 17:
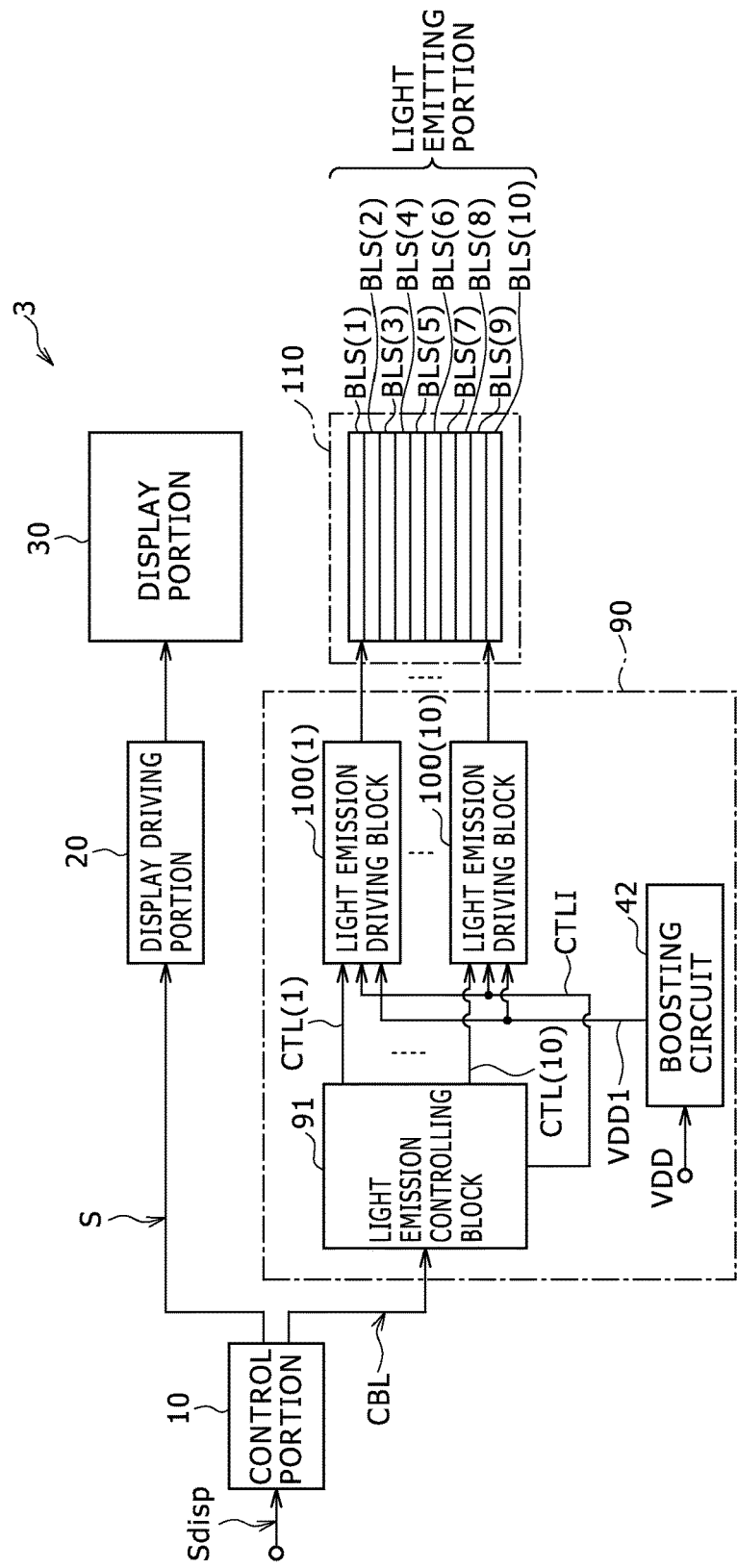
FIG. 17 is a block diagram showing a configuration of a display device according to a third embodiment of the present disclosure.

FIG. 17 shows a configuration of the display device 3 according to the third embodiment of the present disclosure. The display device 3 includes a backlight 110 and a backlight driving portion 90.

The backlight 110 includes 10 light emitting portions BLS (light emitting portions BLS(1) to BLS(10)). Each of the light emitting portions BLS has not only the function of the light emitting portions BL in the first and second embodiments described above, but also a function of detecting the lights emitted and supplying the detection results to the backlight driving portion 90 as will be described later.

The backlight driving portion 90 includes a light emission controlling block 91 and plural light emission driving blocks 100 (light emission driving blocks 100(1) to 100(10)) corresponding to the light emitting portions BLS, respectively. The light emission controlling block 91 has not only the function of the light emission driving block 41 in the first and second embodiments described above, but also a function of generating a discharging current control signal CTLI used to instruct luminance in the light emitting portions BLS in accordance with a backlight control signal CBL, and supplying the discharging current control signal CTLI to each of the light emission driving blocks 100. The light emission driving blocks 100 (the light emission driving blocks 100(1) to 100(10)) drive the light emitting portions BLS (the light emitting portions BLS(1) to BLS(10)), respectively, in accordance with the discharge control signals CTL (the discharge control signals CTL(1) to CTL(10)) and the discharge current control signal CTLI.

Figure 18:
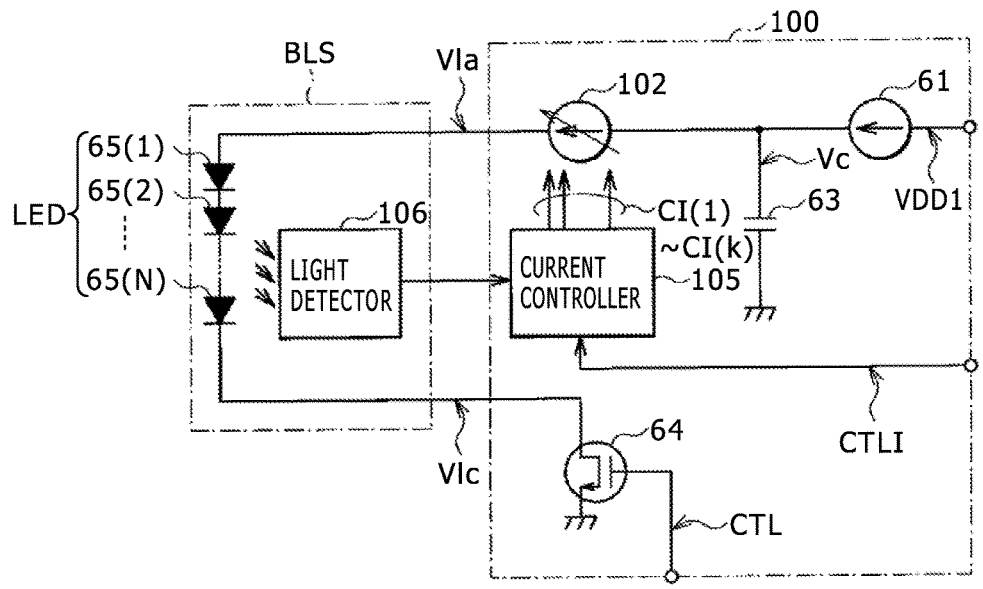
FIG. 18 is a circuit diagram, partly in blocks, showing a configuration of a light emission driving block and a light emitting portion shown in FIG. 17.

FIG. 18 shows a configuration of the light emitting portions BLS and the light emission driving block 100.

The light emitting portions BLS include a light detector 106. The light detector 106 detects light emitted from LEDs 65(1) to 65(N) of the light emitting portions BLS, and supplies the detection results to the light emission driving block 100.

The light emission driving block 100 includes a constant current source 102 and a current controller 105. The constant current source 102 supplies the predetermined current J2 from the capacitive element 63 to the light emitting portion BLS. The constant current source 102 is configured so as to be capable of setting the predetermined current J2 in accordance with k control signals CI (control signals CI(1) to CI(k)). Also, the current controller 105 generates the control signals CI(1) to CI(k) in accordance with the discharge current control signal CTLI and the detection results in the light detector 106, and sets the predetermined current J2 of the constant current source 102.

Figure 19:
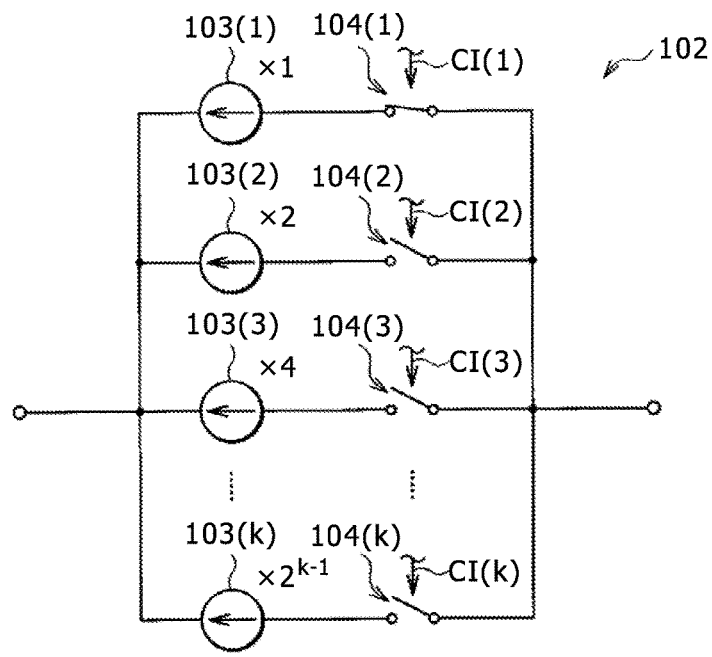
FIG. 19 is a circuit diagram showing a configuration of a constant current source shown in FIG. 18.

FIG. 19 shows a configuration of the constant current source 102. The constant current source 102 includes k constant current sources 103 (constant current sources 103 (1) to 103(k)) and k switches 104 (switches 104(1) to 104(k)). Predetermined current values of the constant current sources 103 are respectively weighted. Specifically, for example, the constant current source 103(1) supplies a current J0, and the constant current source 103(2) supplies a current which is double the current J0 in the constant current source 103(1) (2×J0). The constant current source 103(3) supplies a current which is quadruple of the current J0 in the constant current source 103(1) (4×J0), and the constant current source 103(k) supplies a current which is $2^{k-1}$ times as large as the current J0 in the constant current source 103(1) ($2^{k-1}$×J0). The switches 104 are controlled ON and OFF in accordance with the control signals CI, respectively. Specifically, for example, the switch 104(1) is controlled ON and OFF in accordance with the control signal CI(1), and the switch 104(2) is controlled ON and OFF in accordance with the control signal CI(2).

The constant current sources 103 are connected in series with the switches 104, respectively. Specifically, for example, the constant current source 103(1) is connected in series with the switch 104(1), and the constant current source 103(2) is connected in series with the switch 104(2). Also, circuits in which the constant current sources 103 and the switches 104 are respectively connected in series are connected in parallel with one another.

As a result, the constant current source 102 functions as a current output type Digital/Analog (D/A) converter which can change an amount of current in accordance with the control signals CI(1) to CI(k).

In the display device 3, the amount of the current supplied to each of the light emitting portions BLS (the LEDs 65(1) to 65(N)) for the discharge time period P is controlled in accordance with the discharging current control signal CTLI supplied from the light emission controlling block 91, whereby the light emitting portions BLS are made to emit light, respectively, at luminance instructed by using the discharging current control signal CTLI. In this case, the currents which are supplied to the light emitting portions BLS, respectively, can be controlled in accordance with the detection results from the light detector 106. Therefore, for example, even when the characteristics of the current vs. the luminance of each of the LEDs 65(1) to 65(N) have a non-linear property, it is possible to set the luminance in each of the light emitting portions BLS with a high precision.

Next, a description will be given with respect to merits obtained through the adjustment of the luminance of the light emitting portions BLS by adjusting the amounts of currents.

In general, for adjusting the luminance of the light emitting portions BLS, in addition to controlling the currents supplied to the light emitting portions BLS according to the third embodiment, for example, there is expected a method of controlling the length of the discharge time period P. However, for example in the case shown in FIG. 6, the discharge time period P is about 1/10 of the scanning period T. Thus, when the scanning period T is about 8.33 msec (=1/120 Hz), the discharge time period P is as short as 833 μsec. Therefore, when the luminance of the light emitting portions BLS is adjusted by adjusting the time of the discharge time period P, the light emission controlling block needs to adjust a pulse width of each of the discharge control signals CTL in a time axis direction with a high precision. In this case, there is the possibility that the light emission controlling block 91 cannot adjust the pulse width of each of the discharge control signals CTL with a sufficiently high precision, for example, due to a limitation by the frequency characteristics of the circuit or the like.

On the other hand, in the display device 3 of the third embodiment, since the luminance of the light emitting portions BLS is adjusted by adjusting the currents supplied to the light emitting portions BLS, it is possible to adjust the luminance with a high precision.

As described above, in the display device of the third embodiment, since the currents when the electric charges accumulated in the capacitive elements are discharged can be adjusted, it is possible to adjust the luminance of the light emitting portions.

In addition, in the display device of the third embodiment, since the luminance of the light emitting portions is adjusted by adjusting the currents supplied to the light emitting portions, it is possible to adjust the luminance with a high precision.

In addition, in the display device of the third embodiment, since the light detector for detecting the light emitted from the light emitting portions is provided and the luminance of the light emitting portions is adjusted in accordance with the detection results, it is possible to set the luminance of the light emitting portions with a high precision.

Other effects of the third embodiment are the same as those of the first embodiment described above.

Although the present disclosure has been described so far by giving some embodiments and modification examples thereof, the present disclosure is not limited to the embodiments and the modification examples thereof, and thus various kinds of modifications can be made.

For example, in each of the second and third embodiments, similarly to the case of the first embodiment (FIG. 7), the constant current source 62 may be inserted between the light emitting portion BL and the transistor 64.

In addition, for example, in each of the second and third embodiments, similarly to the case of the first embodiment (FIG. 8), the transistor 64B may be inserted between the constant current source 62 and the light emitting portion.

In addition, for example, in each of the second and third embodiments, similarly to the case of the first embodiment (FIGS. 9A and 9B), the light emitting portions BL (second embodiment) or the light emitting portions BLS (third embodiment) may emit light at the same time.

In addition, for example, in each of the second and third embodiments, similarly to the case of the first embodiment (FIGS. 10 and 11), the capacitive element 63 may be charged with electricity by using another constant current source in addition to the constant current source 61.

In addition, for example, in each of the second and third embodiments, similarly to the case of the first embodiment (FIG. 12), the light emitting portions BL may be disposed in a matrix.

In addition, for example, in each of the second and third embodiments, similarly to the case of the first embodiment (FIG. 13), only one light emitting portion BL having the size corresponding to the display screen of the display portion 30 may be provided.

In addition, for example, in the third embodiment, similarly to the case of the second embodiment (FIGS. 15 and 16), the bias voltage may be applied to the capacitive element 63.

In addition, for example, in each of the first to third embodiments and the modification changes thereof, the backlight includes the 10 light emitting portions BL (first and second embodiments) or the light emitting portions BLS (third embodiment), but the present disclosure is not limited thereto. Instead of adopting this configuration, the backlight may include 9 or less, or 11 or more light emitting portions.

In addition, for example, in each of the first to third embodiments and the modification changes thereof, the capacitive element 63 is charged with electricity by using the constant current source 61, but the present disclosure is not limited thereto. Instead of adopting the configuration, for example, a resistive element may be used. In this case as well, since it is possible to reduce the load current for the boosting circuit in the preceding stage, it is possible to reduce the size of the boosting circuit, and thus it is possible to reduce the cost of the components.

In addition, for example, in each of the first to third embodiments and the modification changes thereof, the present disclosure has been described by exemplifying the display device, but the present disclosure is not limited thereto. That is to say, for example, the present disclosure can also be applied to a flash device for a camera or the like.

It should be noted that the embodiments of the present disclosure can adopt configurations as described below.

(1) A light emitting element driving circuit including:
a capacitive element;
a current limiting section limiting a charging current for the capacitive element;
a first constant current source stabilizing a discharging current supplied from the capacitive element to a light emitting element; and
a switch controlling ON and OFF in supplying of the discharging current to the light emitting element.

(2) The light emitting element driving circuit according to the paragraph (1), in which the current limiting section is a second constant current source for steadily supplying the constant charging current to the capacitive element.

(3) The light emitting element driving circuit according to the paragraph (1) or (2), in which the switch intermittently becomes an ON state.

(4) The light emitting element driving circuit according to any one of the paragraphs (1) to (3), in which the charging current is smaller than the discharging current when the switch becomes an ON state.

(5) The light emitting element driving circuit according to any one of the paragraphs (1) to (4), in which the charging current is supplied from a power source to one terminal of the capacitive element through the current limiting section; and
a bias voltage having a magnitude corresponding to a voltage of the power source is supplied to the other terminal of the capacitive element.

(6) The light emitting element driving circuit according to the paragraph (5), including a bias circuit generating the bias voltage.

(7) The light emitting element driving circuit according to any one of the paragraphs (1) to (4), in which the charging current is supplied from the power source to one terminal of the capacitive element through the current limiting section; and
the other terminal of the capacitive element is grounded.

(8) The light emitting element driving circuit according to any one of the paragraphs (1) to (7), in which the first constant current source is configured so as to be adapted to change the magnitude of the discharging current.

(9) The light emitting element driving circuit according to the paragraph (8) including:
a discharging current controlling section setting the magnitude of the discharging current of the first constant current source in accordance with a light emission luminance of the light emitting element.

(10) The light emitting element driving circuit according to any one of the paragraphs (1) to (9), in which the light emitting element is a light emitting diode.

(11) A light emitting device including:
a light emitting portion including one or plural light emitting elements; and
a light emission driving circuit driving the light emitting portion,
in which the light emission driving circuit includes:
a capacitive element;
a current limiting section limiting a charging current for the capacitive element;
a first constant current source stabilizing a discharging current supplied from the capacitive element to a light emitting element; and
a switch controlling ON and OFF in supplying of the discharging current to the light emitting element.

(12) The light emitting device according to the paragraph (11), in which the one or plural light emitting elements supply light to a display portion.

(13) The light emitting device according to the paragraph (12) including the plural light emitting elements:
In which the plural light emitting elements supply light to portions different from one another of a display surface of the display portion; and
the light emission driving circuit drives in such a way that the light emitting elements emit light, respectively, independently of one another.

(14) The light emitting device according to the paragraph (13), in which the display portion displays thereon an image by carrying out line-sequential scanning;
the plural light emitting elements are disposed in parallel relation with one another in a scanning direction of the line-sequential scanning in the display portion; and
the light emission driving circuit drives the light emitting elements in such a way that the light emitting elements emit light with a scanning period of the line-sequential scanning in the display portion.

(15) The light emitting device according to the paragraph (14), in which a light emission duty ratio representing a ratio of a light emission time of the light emitting element in the scanning period is equal to or smaller than 25%.

(16) The light emitting device according to the paragraph (14) or (15), in which in the scanning period, an amount of charge in the capacitive element by the current limiting section is equal to or more than an amount of discharge by the first constant current source.

(17) The light emitting device according to the paragraph (13), in which the light emission of the light emitting elements is controlled based on a displayed image.

(18) A display device including:
a display portion;
a light emitting portion including one or plural light emitting elements and supplying light to the display portion; and
a light emission driving circuit driving the light emitting portion,
in which the light emission driving circuit includes:
a capacitive element;
a current limiting section limiting a charging current for the capacitive element;
a first constant current source stabilizing a discharging current supplied from the capacitive element to each of the light emitting elements; and
a switch controlling ON and OFF in supplying the discharging current to each of the light emitting element.

(19) A light emission controlling method including:
limiting and charging a charging current for a capacitive element; and
discharging electric charges accumulated in the capacitive element in a form of a given discharging current for a discharging time period, and causing a light emitting element to emit light in accordance with the discharging current.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting element driving circuit comprising:
a capacitive element having a first terminal and a second terminal;
a second constant current source for supplying a first set current as a charging current steadily and constantly to the first terminal of said capacitive element;
a first constant current source stabilizing a discharging current supplied from the first terminal of said capacitive element to a light emitting element, in which the first constant current source supplies a second set current as the discharging current from the first terminal of the capacitive element to the light emitting element; and
a switch controlling ON and OFF in supplying said discharging current to said light emitting element,
the second constant current source supplying the charging current steadily and constantly to the first terminal of said capacitive element when the said switch becomes an ON state and an OFF state, in which the first constant current source, the light emitting element and the switch are connected in series in a series circuit extending from the first terminal of said capacitive element to ground and in which the first constant current source is arranged in the series circuit between the switch and the first terminal of said capacitive element,
wherein a bias voltage other than ground, and having a magnitude corresponding to a first voltage of a power source and according to a withstand voltage of the capacitive element, is supplied to the second terminal of said capacitive element, in which the first voltage is supplied to the second constant current source,
wherein the first constant current source and the second constant current source are configured such that a product of the first set current and a scanning time period for the light emitting element is greater than or equal to a product of the second set current and a discharge time period for the capacitive element which is equal to a time period when the switch is in the OFF state, and such that when the switch is repetitively switched at a predetermined interval to the OFF state from the ON state and to the ON state from the OFF state, a predetermined voltage across the first and second terminals of the capacitive element is maintained in a predetermined range, in which the predetermined range has a maximum voltage not greater than a difference between a second voltage supplied from the power source to the second constant current source and the first voltage.

2. The light emitting element driving circuit according to claim 1,
wherein said charging current is supplied from the power source to the first terminal of said capacitive element through said second constant current source.

3. The light emitting element driving circuit according to claim 1 comprising:
a bias circuit generating said bias voltage.

4. The light emitting element driving circuit according to claim 1,
wherein the first set current is a load current on the power source.

5. The light emitting element driving circuit according to claim 1,
wherein the series circuit extends from the first terminal of said capacitive element in sequence order of the first constant current source and the light emitting element,
wherein the first constant current source has a first end and a second end opposite the first end, and
wherein the first end of the first constant current source is in direct connection with the first terminal of said capacitive element and the second end of the first constant current source is in direct connection with the light emitting element.

6. The light emitting element driving circuit according to claim 1,
wherein the series circuit extends from the first terminal of said capacitive element in sequence order of the first constant current source and the switch,
wherein the first constant current source has a first end and a second end opposite the first end, and
wherein the first end of the first constant current source is in direct connection with the first terminal of said capacitive element and the second end of the first constant current source is in direct connection with a first end of the switch, and a second end of the switch which is opposite the first end of the switch is in direct connection with the light emitting element.

* * * * *